United States Patent
Engdegard et al.

(10) Patent No.: US 9,319,159 B2
(45) Date of Patent: Apr. 19, 2016

(54) HIGH QUALITY DETECTION IN FM STEREO RADIO SIGNAL

(71) Applicant: DOLBY INTERNATIONAL AB, Amsterdam Zuidoost (NL)

(72) Inventors: Jonas Engdegard, Stockholm (SE); Heiko Purnhagen, Sundbyberg (SE); Leif Sehlstrom, Järfälla (SE)

(73) Assignee: Dolby International AB, Amsterdam, Zuidoost (NL)

( * ) Notice: Subject to any disclaimer, the term of this patent is extended or adjusted under 35 U.S.C. 154(b) by 124 days.

(21) Appl. No.: 14/346,946

(22) PCT Filed: Oct. 1, 2012

(86) PCT No.: PCT/EP2012/069330
§ 371 (c)(1),
(2) Date: Mar. 24, 2014

(87) PCT Pub. No.: WO2013/045693
PCT Pub. Date: Apr. 4, 2013

(65) Prior Publication Data
US 2014/0226822 A1    Aug. 14, 2014

Related U.S. Application Data

(60) Provisional application No. 61/540,876, filed on Sep. 29, 2011.

(51) Int. Cl.
*H04H 40/45* (2008.01)
*G10L 25/69* (2013.01)
*H04B 1/16* (2006.01)
*G10L 19/008* (2013.01)

(52) U.S. Cl.
CPC ............ *H04H 40/45* (2013.01); *G10L 25/69* (2013.01); *H04B 1/1676* (2013.01); *G10L 19/008* (2013.01)

(58) Field of Classification Search
CPC ....... H04H 40/36; H04H 40/45; H04H 40/54; H04H 40/63; H04H 40/72; H04H 40/18; H04H 40/81; H04B 1/1646; H04B 1/1676; G10L 25/69; G10L 25/60; G10L 19/008; H04R 5/00
USPC ........................................................ 381/1–14
See application file for complete search history.

(56) References Cited

U.S. PATENT DOCUMENTS 5,067,157 A    11/1991    Ishida
7,313,240 B2 *    12/2007    Wildhagen ............. H04H 40/45
                                                                            381/11

(Continued)

FOREIGN PATENT DOCUMENTS

EP          0629054       12/1994
JP          2003-143094   5/2003

(Continued)

OTHER PUBLICATIONS

Purnhagen, H. "Low Complexity Parametric Stereo Coding in MPEG-4" Proc. of the International Conference on Digital Audioeffects, Oct. 5, 2004, pp. 163-168.

(Continued)

*Primary Examiner* — Vivian Chin
*Assistant Examiner* — Jason R Kurr

(57) ABSTRACT

The present document relates to audio signal processing, in particular to an apparatus and a corresponding method for improving an audio signal of an FM stereo radio receiver. In particular, the present document relates to a method and system for reliably detecting the quality of a received FM stereo radio signal and for selecting an appropriate processing based on the detected quality. An apparatus (20) configured to estimate the quality of a received multi-channel FM radio signal is described. The received multi-channel FM radio signal is representable as a mid signal and a side signal, and the side signal is indicative of a difference between a left signal and a right signal. The apparatus (20) comprises a power determination unit configured to determine (101) a power of the mid signal, referred to as mid power, and a power of the side signal, referred to as side power; a ratio determination unit configured to determine (102) a ratio of the mid power and the side power, thereby yielding a mid-to-side ratio; and a quality determination unit configured to determine (105) a quality indicator of the received FM radio signal based at least on the mid-to-side ratio.

30 Claims, 7 Drawing Sheets

(56) References Cited

U.S. PATENT DOCUMENTS

| | | | |
|---|---|---|---|
| 2011/0194699 A1* | 8/2011 | Baker | H04H 40/72 |
| | | | 381/3 |
| 2012/0020484 A1* | 1/2012 | Grancharov | H04M 3/2236 |
| | | | 381/56 |
| 2012/0207307 A1 | 8/2012 | Purnhagen | |
| 2013/0142339 A1 | 6/2013 | Purnhagen | |
| 2013/0142340 A1 | 6/2013 | Sehlstrom | |

FOREIGN PATENT DOCUMENTS

| | | |
|---|---|---|
| JP | 2005-130074 | 5/2005 |
| JP | 2007-529020 | 10/2007 |

OTHER PUBLICATIONS

ISO/IEC 23003-1:2007, Information Technology—MPEG Audio Technologies—Part 1: MPEG Surround, 2007.

ISO/IEC 14496-3:2005, Information Technology—Coding of Audio-Visual Objects—Part 3:Audio, 2005.

Baumgarte, F. et al. "Binaural Cue Coding—Part 1: Psychoacoustic Fundamentals and Design Principles" IEEE Transactions on Speech and Audio Processing, vol. 11, No. 6, Nov. 2003, pp. 509-519.

Faller, C. et al. "Binaural Cue Coding—Part II: Schemes and Applications" IEEE Transactions on Speech and Audio Processing, vol. 11, No. 6, Nov. 2003, pp. 520-531.

\* cited by examiner

HIGH QUALITY DETECTION IN FM STEREO RADIO SIGNAL

TECHNICAL FIELD

The present document relates to audio signal processing, in particular to an apparatus and a corresponding method for improving an audio signal of an FM stereo radio receiver. In particular, the present document relates to a method and system for reliably detecting the quality of a received FM stereo radio signal and for selecting an appropriate processing based on the detected quality.

BACKGROUND

In an analog FM (frequency modulation) stereo radio system, the left channel (L) and right channel (R) of the audio signal are conveyed in a mid-side (M/S) representation, i.e. as mid channel (M) and side channel (S). The mid channel M corresponds to a sum signal of L and R, e.g. M=(L+R)/2, and the side channel S corresponds to a difference signal of L and R, e.g. S=(L−R)/2. For transmission, the side channel S is modulated onto a 38 kHz suppressed carrier and added to the baseband mid signal M to form a backwards-compatible stereo multiplex signal. This multiplex baseband signal is then used to modulate the HF (high frequency) carrier of the FM transmitter, typically operating in the range between 87.5 to 108 MHz.

When reception quality decreases (i.e. the signal-to-noise ratio over the radio channel decreases), the S channel typically suffers more during transmission than the M channel. In many FM receiver implementations, the S channel is muted when the reception conditions gets too noisy. This means that the receiver falls back from stereo to mono in case of a poor HF radio signal.

Even in case the mid signal M is of acceptable quality, the side signal S may be noisy and thus can severely degrade the overall audio quality when being mixed in the left and right channels of the output signal (which are derived e.g. according to L=M+S and R=M−S). When a side signal S has only poor to intermediate quality, there are two options: either the receiver chooses accepting the noise associated with the side signal S and outputs a real stereo signal comprising a noisy left and right signal, or the receiver drops the side signal S and falls back to mono.

Parametric Stereo (PS) coding is a technique from the field of very low bitrate audio coding. PS allows encoding a 2-channel stereo audio signal as a mono downmix signal in combination with additional PS side information, i.e. the PS parameters. The mono downmix signal is obtained as a combination of both channels of the stereo signal. The PS parameters enable the PS decoder to reconstruct a stereo signal from the mono downmix signal and the PS side information. Typically, the PS parameters are time- and frequency-variant, and the PS processing in the PS decoder is typically carried out in a hybrid filterbank domain incorporating a QMF bank. The document "Low Complexity Parametric Stereo Coding in MPEG-4", Heiko Purnhagen, Proc. Digital Audio Effects Workshop (DAFx), pp. 163-168, Naples, IT, October 2004 describes an exemplary PS coding system for MPEG-4. Its discussion of parametric stereo, in particular with regards to the determination of parametric stereo parameters, is hereby incorporated by reference. Parametric stereo is supported e.g. by MPEG-4 Audio. Parametric stereo is discussed in section 8.6.4 and Annexes 8.A and 8.C of the MPEG-4 standardization document ISO/IEC 14496-3:2005 (MPEG-4 Audio, 3rd edition). These parts of the standardization document are hereby incorporated by reference for all purposes. Parametric stereo is also used in the MPEG Surround standard (see document ISO/IEC 23003-1:2007, MPEG Surround). Also, this document is hereby incorporated by reference for all purposes. Further examples of parametric stereo coding systems are discussed in the document "Binaural Cue Coding—Part I: Psychoacoustic Fundamentals and Design Principles," Frank Baumgarte and Christof Faller, IEEE Transactions on Speech and Audio Processing, vol 11, no 6, pages 509-519, November 2003, and in the document "Binaural Cue Coding—Part II: Schemes and Applications," Christof Faller and Frank Baumgarte, IEEE Transactions on Speech and Audio Processing, vol 11, no 6, pages 520-531, November 2003. In the latter two documents the term "binaural cue coding" is used, which is an example of parametric stereo coding.

It has been proposed in WO2011/029570 and PCT/EP2011/064077 to use PS encoding of a received FM stereo signal in order to reduce the noise comprised within the received side signal of the received FM stereo signal. The general principle of the Parametric Stereo (PS) based FM stereo radio noise reduction technology is to use parametric stereo parameters derived from the received FM stereo signal, in order to replace the received noisy side signal S (e.g. S=(L−R)/2) by a less noisy version of the side signal which has been parametrically reconstructed from the mid signal M (e.g. M=(L+R)/2) and one or more PS parameters. The performance of this technology can be improved by taking into account characteristic properties (e.g. the spectral flatness) of the received noise in the side signal. Furthermore, WO PCT/EP2011/064084 describes extensions of this technology that allow improving the performance of PS based FM stereo noise reduction in situations where reception is switching back and forth between mono and stereo. The disclosure of the above mentioned patent documents is incorporated by reference.

In the present document, a method and system is described which may be used to further improve the quality of received FM stereo signal.

SUMMARY

The PS based FM stereo noise reduction technology is typically beneficial in improving the perceived sound quality in case of intermediate or bad reception conditions where the side signal suffers from intermediate or high noise levels. On the other hand, it is a finding of the present document that in case of good reception conditions where the side signal has relatively low noise levels, the parametric nature of the PS based stereo noise reduction technology may limit the sound quality when compared to the unprocessed signal. Hence, it is proposed to bypass the PS based stereo noise reduction technology in case of good reception conditions. A problem in this context is to reliably detect such a High Quality (HQ) reception condition, i.e., a condition where it is perceptually advantageous to bypass the PS based stereo noise reduction technology.

According to an aspect, an apparatus configured to estimate the quality of a received multi-channel FM radio signal is described. The multi-channel FM radio signal may be a two channel stereo signal. In particular, the received multi-channel FM radio signal may be representable as or presentable as or indicative of a mid signal and a side signal. Furthermore, the side signal may be indicative of a difference between a left signal and a right signal of a stereo signal.

In an embodiment, the apparatus comprises a power determination unit configured to determine a power of the mid signal (i.e. a mid power) and a power of the side signal (i.e. a side power). Furthermore, the apparatus comprises a ratio determination unit configured to determine a ratio of the mid power and the side power, thereby yielding a mid-to-side ratio. A quality determination unit of the apparatus may be configured to determine a quality indicator of the received FM radio signal based on at least the mid-to-side ratio (MSR). In other words, the apparatus, which may also be referred to as a quality detection unit, may be configured to determine an indicator of the quality of the received FM signal by analyzing the ratio of the energy (or power) of the mid signal and the side signal, i.e. the MSR. It is a finding of the present document, that—notably in situations where the energy of the side signal exceeds the energy of the mid signal by a pre-determined power threshold (e.g. 6 dB or 5 dB or 4 dB)—the MSR provides a good approximation of the signal-to-noise ratio (SNR) of the received FM signal.

As indicated above, the power determination unit may be configured to determine a mid power and/or a side power. The power of the mid signal at time instant n may be determined as an average of the squared mid signal at a plurality of time instants in the vicinity of the time instant n. In other words, the mid power at time instant n may be determined as an expectation value of the squared mid signal samples at this time instant n. The power of the side signal at time instant n may be determined in a similar manner.

The power determination unit may be further configured to determine a plurality of subband mid powers for a plurality of subbands of the mid signal, and a plurality of subband side powers for a plurality of corresponding subbands of the side signal. The plurality of subbands of the mid signal and the plurality of subbands of the side signal may be subbands derived using a quadrature mirror (QMF) filterbank. In order to determine a reliable quality indicator, it may be sufficient to only analyze the mid and side powers in a sub-range of the frequency range covered by the mid and side signals. As a consequence, the computational complexity for determining the quality indicator may be reduced. In particular, it may be sufficient to analyze the mid and side powers in a higher part of the frequency range. Even more particularly, the mid signal and the side signal may cover a low frequency range up to a medium frequency and a high frequency range up from the medium frequency. The plurality of subbands of the mid signal and the plurality of subbands of the side signal may lie within the high frequency range. By way of example, the medium frequency may be greater or equal to 1 kHz, 2 kHz, 3 kHz, 4 kHz, 5 kHz, 6 kHz, 7 kHz, 8 kHz, 9 kHz, 10 kHz, 11 kHz or 12 kHz.

Based on the plurality of subband mid powers and the plurality of subband side powers, the ratio determination unit may be configured to determine a plurality of subband mid-to-side ratios. The quality determination unit may then be configured to determine the quality indicator of the received FM radio signal from the plurality of subband mid-to-side ratios. In a particular embodiment, the quality determination unit is configured to determine the quality indicator of the received FM radio signal from the minimum of the plurality of subband mid-to-side ratios across the plurality of subbands.

Alternatively, the quality determination unit may be configured to differently weight the plurality of subband mid-to-side ratios depending on frequencies covered by the respective subband, thereby yielding a plurality of weighted subband mid-to-side ratios. The weighting of the plurality of subband mid-to-side ratios as a function of the frequencies covered by the corresponding subbands may be beneficial in order to take into account a non-uniform distribution of the energy of noise across the signal frequency range, which typically results from the FM radio transmission. In case of weighted subband mid-to-side ratios, the quality determination unit may be configured to determine the quality indicator of the received FM radio signal from the minimum of the plurality of weighted subband mid-to-side ratios across the plurality of subbands.

Alternatively or in addition to analyzing the mid and side powers within a plurality of subbands, the power determination unit may be configured to determine a sequence of mid powers and a corresponding sequence of side powers at a sequence of succeeding time instants. In other words, in addition to analyzing the mid and side powers (or the subband mid and side powers) at a particular time instant n, the power determination unit may be configured to determine the mid and side powers (or the subband mid and side powers) for a plurality of succeeding time instants, thereby providing a sequence of mid and side powers (or a sequence of pluralities of subband mid and side powers).

In such cases, the ratio determination unit may be configured to determine a sequence of mid-to-side ratios at the sequence of time instants from the sequence of mid powers and the sequence of side powers and/or configured to determine a sequence of pluralities of subband mid-to-side ratios at the sequence of time instants from the sequence of pluralities of subband mid powers and the sequence of pluralities of subband side powers. Using these MSR values, the quality determination unit may be configured to determine a sequence of quality indicators from the sequence of mid-to-side ratios and/or from the sequence of pluralities of subband mid-to-side ratios at the sequence of time instants.

In order to prevent an erratic behavior of the sequence of quality indicators (notably when transiting from indicating a low quality FM signal to indicating a high quality FM signal), it may be beneficial to determine the sequence of quality indicators from a sequence of smoothened mid-to-side ratios or smoothened subband mid-to-side ratios. The sequence of smoothened subband mid-to-side ratios may be determined by smoothening selected subband mid-to-side ratios from the sequence of pluralities of subband mid-to-side ratios along the sequence of time instants. In particular, at each time instant n, a particular one of the plurality of subband mid-to-side ratios at this time instant n may be selected (e.g. the minimum MSR value or the minimum weighted MSR value). The smoothing may be performed using an inverted peak decay function. In an embodiment, the sequence of smoothened subband mid-to-side ratios is determined by determining the smoothened subband mid-to-side ratio at time instant n as the smaller of the smoothened subband mid-to-side ratio at a preceding time instant n−1 from the sequence of time instants, weighted by a decay factor, and a minimum of the plurality of subband mid-to-side ratios at time instant n.

The quality determination unit may be configured to determine the quality indicator at time instant n by normalizing the mid-to-side ratio at time instant n (or by normalizing the minimum subband mid-to-side ratio or by normalizing the smoothened subband mid-to-side ratio at time instant n). In general terms, the quality determination unit may be configured to determine the quality indicator from a normalized version of the one or more mid-to-side ratios which are used to determine the quality indicator. For this purpose, a lower power threshold and a higher power threshold may be used. By way of example, the quality indicator at time instant n may be normalized as $$\alpha_{HQ} = \begin{cases} 0 & \text{, if } q < \text{MSR\_LOW} \\ 1 & \text{, if } q > \text{MSR\_HIGH} \\ \dfrac{q - \text{MSR\_LOW}}{\text{MSR\_HIGH} - \text{MSR\_LOW}} & \text{, otherwise} \end{cases}$$

with q being a mid-to-side ratio at time instant n (e.g. the smoothened subband mid-to-side ratio), and MSR_LOW being the lower power threshold and MSR_HIGH being the higher power threshold. The lower power threshold in a logarithmic domain may be smaller or equal to −4 dB, −5 dB or −6 dB, and/or the higher power threshold in a logarithmic domain may be greater or equal to −5 dB, −4 dB or −3 dB. As a result of the normalization, the quality indicator may take on values in a pre-determined interval (e.g. [0,1]), with one end of the interval indicating a low quality of the received FM signal (e.g. 0) and the other end of the interval indicating a high quality of the received FM signal (e.g. 1).

In the following, various examples/embodiments are described on how the quality indicator can be enhanced to indicate the quality of the received FM signal with a higher degree of reliability. The various examples/embodiments can be combined in an arbitrary manner.

In an embodiment, the quality determination unit is configured to determine the quality indicator also based on at least a spectral flatness measure (SFM) value which is characteristic of the spectral flatness of the side signal. Examples of how such an SFM value may be determined are described in the detailed description. The spectral flatness of the side signal is typically an indicator of the degree of noise comprised within the received FM signal. Typically an increasing spectral flatness of the side signal yields a reduction of the quality indicator, i.e. an indication of a reduced quality of the received FM signal. In particular, a modified impact factor may be determined as $$\alpha_{HQ}' = (1 - \text{SFM\_impact\_factor}) * \alpha_{HQ},$$

wherein SFM_impact_factor is a normalized SFM value ranging from 0 to 1, with 0 indicating a low degree of spectral flatness and 1 indicating a high degree of spectral flatness of the side signal; wherein $\alpha'_{HQ}$ is a modified quality indicator determined based at least on the SFM value and the mid-to-side ratio; wherein $\alpha_{HQ}$ is the quality indicator determined based at least on the mid-to-side ratio; and wherein $\alpha'_{HQ}$ and $\alpha_{HQ}$ are ranging from 0 to 1, with 0 indicating a low quality and 1 indicating a high quality.

In another embodiment, the quality determination unit is configured to determine the quality indicator also based on at least a total power level of the side signal. Typically, a decreasing total power level of the side signal is an indication of little payload and relatively high noise within the received FM signal. As such, a decreasing total power level of the side signal should decrease the quality indicator. By way of example, a modified quality indicator may be determined as $$\alpha'_{HQ} = g_{gate} \alpha_{HQ},$$

with $$g_{gate} = \begin{cases} 0 & \text{, if } S_{sum} < \text{S\_THRES\_LOW} \\ 1 & \text{, if } S_{sum} < \text{S\_THRES\_HIGH} \\ \frac{S_{sum} - \text{S\_THRES\_LOW}}{\text{S\_THRES\_HIGH} - \text{S\_THRES\_LOW}} & \text{, otherwise} \end{cases}$$

wherein $S_{sum}$ is the total power level of the side signal; wherein S_THRES_LOW and S_THRES_HIGH are normalization thresholds; wherein $\alpha'_{HQ}$ is the modified quality indicator determined based at least on the total power level of the side signal and the mid-to-side ratio; wherein $\alpha_{HQ}$ is the quality indicator determined based at least on the mid-to-side ratio; and wherein $\alpha'_{HQ}$ and $\alpha_{HQ}$ are ranging from 0 to 1, with 0 indicating a low quality and 1 indicating a high quality.

In a further embodiment, the quality determination unit is configured to determine the quality indicator also based on at least a channel level difference, CLD, parameter. The channel level difference parameter may reflect or may correspond to a ratio between a power of the left signal and a power of the right signal. The left signal and the right signal of an FM stereo signal may be determined from the mid and side signals of the FM stereo signal as described in the present document. In particular, the quality determination unit may be configured to determine the quality indicator at least from the sum of the mid-to-side ratio and the absolute value of the CLD parameter. Typically, the CLD parameter is given on a logarithmic scale. Even more particularly, the sum of the mid-to-side ratio and the absolute value of the CLD parameter at time instant n may replace the mid-to-side ratios in the methods for determining the quality indicator outlined in the present document.

According to another aspect, a system configured to generate an improved stereo signal from a received FM radio signal is described. As indicated the FM radio signal is typically indicative of a received left signal and a received right signal. The system comprises an apparatus which is configured to determine a quality indicator of the received FM radio signal. For this purpose, the apparatus may comprise any of the features and components outlined in the present document. The system is configured to generate the improved stereo signal in dependence of or based on the determined quality indicator.

In an embodiment, the system comprises an FM noise reduction unit which may be configured to generate a noise reduced stereo signal from the received FM radio signal based on one or more parameters indicative of the correlation and/or the difference of the received left and right signals. Furthermore, the system may comprise a bypass configured to provide the received left and right signal. The system may be configured to select the noise reduced stereo signal (or parts thereof) and/or the received left and right signal (or parts thereof) as the improved stereo signal based on the determined quality indicator. For this purpose, the system may comprise a combining unit which is configured determine the improved stereo signal from the noise reduced stereo signal and the received left and right signal using the quality indicator.

The FM noise reduction unit may be configured to generate the noise reduced stereo signal from a parametric stereo representation of the received FM radio signal; wherein the parametric stereo representation comprises one or more parametric stereo parameters. Alternatively, the FM noise reduction unit may be configured to generate the noise reduced stereo signal from other representations of the received FM radio signal, e.g. a prediction based representation. Furthermore, the FM noise reduction unit may be configured to conceal a dropout of the received FM stereo signal to mono at time instant n using the one or more parametric stereo parameters (or the parameters of an alternative representation) determined at a time instant preceding the time instant n. Concealment within the FM noise reduction unit may indicate low quality of the received FM signal. Consequently, the system may be configured to modify the quality indicator, subject to detecting concealment within the FM noise reduction unit. In particular, the quality indicator may be modified to ensure that the improved stereo signal is only selected from the noise reduced stereo signal (and not from the received left and right signals).

Furthermore, the FM noise reduction unit may be configured to generate the noise reduced stereo signal from the received FM radio signal using the quality indicator. As such, the FM noise reduction unit may take into account the quality of the received FM stereo signal when determining the noise reduced stereo signal. This may be done by adjusting the one or more parameters indicative of the correlation and/or the difference of the received left and right signals using the quality indicator. By way of example, the FM noise reduction unit may be configured to determine the noise reduced stereo signal using a prediction based parameterization. In this case, the prediction parameters a and b of the prediction based parameterization (see detailed description) may be adjusted using the quality indicator.

Alternatively or in addition the FM noise reduction unit may be configured to generate a noise reduced side signal of the noise reduced stereo signal from a downmix signal determined from the sum of the received left and right signals adjusted by a downmix gain. The downmix gain may be indicative of an in-phase and/or out-of-phase behaviour of the received left and right signals. The downmix gain may be adjusted using the quality indicator.

The combining unit may be configured to blend between the noise reduced stereo signal and the received left and right signal using the quality indicator. In particular, the combining unit may comprise a noise reduced stereo gain unit configured to weight the noise reduced stereo signal using a noise reduced stereo gain. Furthermore, the combining unit may comprise a bypass gain unit configured to weight the received left and right signals using a bypass gain. In addition, the combining unit may comprise an adding unit configured to add respective signals of the weighted noise reduced stereo signal and the weighted received left and right signals; wherein the noise reduced stereo gain and/or the bypass gain may be dependent on the quality indicator. Even more particularly, the left and right signal of the improved stereo signal may be determined within the combining unit as $$\begin{pmatrix} L_{out} \\ R_{out} \end{pmatrix} = \alpha_{HQ} \begin{pmatrix} L_{FM} \\ R_{FM} \end{pmatrix} + (1 - \alpha_{HQ}) \begin{pmatrix} L_{PS} \\ R_{PS} \end{pmatrix}$$

with $L_{FM}, R_{FM}$ being the received left and right signals; with $L_{PS}, R_{PS}$ being a left and right signal of the noise reduced stereo signal; and with $\alpha_{HQ}$ being the quality indicator ranging from 0 to 1, with 0 indicating a low quality and 1 indicating a high quality.

According to a further aspect, a mobile communication device (e.g. a smartphone or a mobile telephone) is described. The mobile communication device comprises the system for improving the quality of a received FM signal outlined in the present document. Furthermore, the mobile communication device may comprise an FM stereo receiver configured to receive an FM radio signal.

According to another aspect, a method for estimating the quality of a received multi-channel FM radio signal is described. The received multi-channel FM radio signal may be representable as a mid signal and a side signal. Furthermore, the side signal may be indicative of a difference between a left signal and a right signal. The method may comprise determining a power of the mid signal, referred to as mid power, and a power of the side signal, referred to as side power. Furthermore, the method may comprise determining a ratio of the mid power and the side power, thereby yielding a mid-to-side ratio. In addition, the method may comprise determining a quality indicator of the received FM radio signal based on at least the mid-to-side ratio.

According to another aspect, a method for generating an improved stereo signal from a received FM radio signal is described. The FM radio signal may be indicative of a received left signal and a received right signal. The method may comprise determining a quality indicator of the received FM radio signal according to any of the methods outlined in the present document. Furthermore, the method may comprise generating the improved stereo signal from the received FM radio signal using the quality indicator.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including their preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

DESCRIPTION OF DRAWINGS

The invention is explained below by way of illustrative examples with reference to the accompanying drawings, wherein.

DETAILED DESCRIPTION

Figure 1:
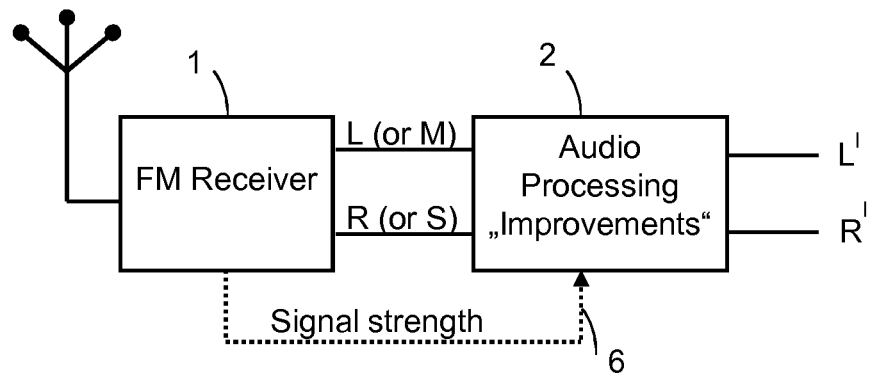
FIG. 1 illustrates a schematic embodiment for improving the stereo output of an FM stereo radio receiver.

FIG. 1 shows a simplified schematic embodiment for improving the stereo output of an FM stereo radio receiver 1. As discussed in the background section of this document, in FM radio the stereo signal is transmitted by design as a mid signal and side signal. In the FM receiver 1, the side signal is used to create the stereo difference between the left signal L and the right signal R at the output of the FM receiver 1 (at least when reception is good enough and the side signal information is not muted). In other words, the side signal is used to create the left and right audio signal from the mid signal. The left and right signals L, R may be digital or analog signals.

For improving the audio signals L, R of the FM receiver, an audio processing apparatus 2 is used which generates a stereo audio signal L' and R' at its output. The audio processing apparatus 2 is enabled to perform noise reduction of a received FM radio signal using parametric stereo. The audio processing in the apparatus 2 is preferably performed in the digital domain; thus, in case of an analog interface between the FM receiver 1 and the audio processing apparatus 2, an analog-to-digital converter is used before digital audio processing in the apparatus 2. The FM receiver 1 and the audio processing apparatus 2 may be integrated on the same semiconductor chip or may be part of two semiconductor chips. The FM receiver 1 and the audio processing apparatus 2 can be part of a wireless communication device such as a cellular telephone, a personal digital assistant (PDA) or a smart phone. In this case, the FM receiver 1 may be part of the baseband chip having additional FM radio receiver functionality. In another application, the FM receiver 1 and the audio processing apparatus 2 can be part of a vehicle audio system in order to compensate for varying reception conditions of a moving vehicle.

Instead of using a left/right representation at the output of the FM receiver 1 and the input of the apparatus 2, a mid/side representation may be used at the interface between the FM receiver 1 and the apparatus 2 (see M, S in FIG. 1 for the mid/side representation and L, R for the left/right representation). Such a mid/side representation at the interface between the FM receiver 1 and the apparatus 2 may result in a reduced processing load since the FM receiver 1 already receives a mid/side signal and the audio processing apparatus 2 may directly process the mid/side signal without downmixing. The mid/side representation may be advantageous if the FM receiver 1 is tightly integrated with the audio processing apparatus 2, in particular if the FM receiver 1 and the audio processing apparatus 2 are integrated on the same semiconductor chip.

Optionally, a radio signal strength signal 6 indicating the radio reception condition may be used for adapting the audio processing in the audio processing apparatus 2. This will be explained later in this specification.

The combination of the FM radio receiver 1 and the audio processing apparatus 2 corresponds to an FM radio receiver having an integrated noise reduction system.

Figure 2:
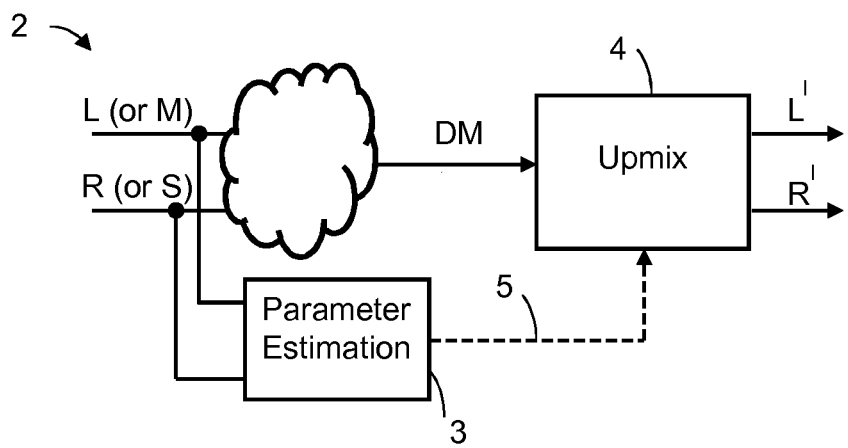
FIG. 2 illustrates an embodiment of the audio processing apparatus based on the concept of parametric stereo.

FIG. 2 shows an embodiment of the audio processing apparatus 2 which is based on the concept of parametric stereo. The apparatus 2 comprises a PS parameter estimation unit 3. The parameter estimation unit 3 is configured to determine PS parameters 5 based on the input audio signal to be improved (which may be either in left/right or mid/side representation). The PS parameters 5 may include, amongst others, a parameter indicating inter-channel intensity differences (IID or also called CLD—channel level differences) and/or a parameter indicating an inter-channel cross-correlation (ICC). Preferably, the PS parameters 5 are time- and frequency-variant. In case of an M/S representation at the input of the parameter estimation unit 3, the parameter estimation unit 3 may nevertheless determine PS parameters 5 which relate to the L/R channels, by applying the appropriate conversion of the L/R channels.

An audio signal DM is obtained from the input signal. In case the input audio signal uses already a mid/side representation, the audio signal DM may directly correspond to the mid signal. In case the input audio signal has a left/right representation, the audio signal may be generated by downmixing the audio signal. Preferably, the resulting signal DM after downmix corresponds to the mid signal M and may be generated by the following equation:

$$DM=(L+R)/d, \text{ e.g. with } d=2,$$

i.e. the downmix signal DM may correspond to the average of the L and R signals. For different values of the scaling factor d, the average of the L and R signals is amplified or attenuated.

The apparatus further comprises an upmix unit 4 also called stereo mixing module or stereo upmixer. The upmix unit 4 is configured to generated a stereo signal L', R' based on the audio signal DM and the PS parameters 5. Preferably, the upmix unit 4 does not only use the DM signal but also uses a side signal or some kind of pseudo side signal (not shown). This will be explained later in the specification in connection with more extended embodiments in FIGS. 4 and 5.

The apparatus 2 is based on the idea that due to its noise the received side signal may be too noisy for reconstructing the stereo signal by simply combining the received mid and side signals; nevertheless, in this case the side signal or side signal's component in the L/R signal may be still good enough for stereo parameter analysis in the PS parameter estimation unit 3. The resulting PS parameters 5 can be then used for generating a stereo signal L', R' having a reduced level of noise in comparison to the audio signal directly at the output of the FM receiver 1.

Thus, a bad FM radio signal can be "cleaned-up" by using the parametric stereo concept. The major part of the distortion and noise in an FM radio signal is located in the side channel which may be not used in the PS downmix. Nevertheless, the side channel is, even in case of bad reception, often of sufficient quality for PS parameter extraction.

In the following drawings, the input signal to the audio processing apparatus 2 is a left/right stereo signal. With minor modifications to some modules within the audio processing apparatus 2, the audio processing apparatus 2 can also process an input signal in mid/side representation. Therefore, the concepts discussed herein can be used in connection with an input signal in mid/side representation.

Figure 3:
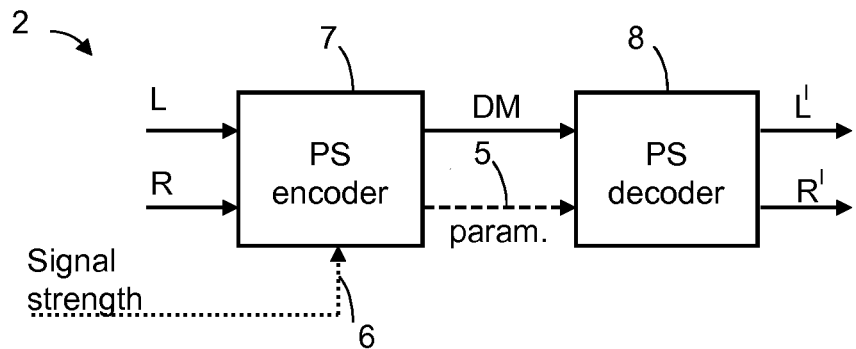
FIG. 3 illustrates another embodiment of the PS based audio processing apparatus having a PS encoder and a PS decoder.

FIG. 3 shows an embodiment of the PS based audio processing apparatus 2, which makes use of a PS encoder 7 and a PS decoder 8. The parameter estimation unit 3, in this example, is part of the PS encoder 7 and the upmix unit 4 is part of the PS decoder 8. The terms "PS encoder" and "PS decoder" are used as names for describing the function of the audio processing blocks within the apparatus 2. It should be noted that the audio processing is all happening at the same FM receiver device. These PS encoding and PS decoding processes may be tightly coupled and the terms "PS encoding" and "PS decoding" are only used to describe the heritage of the audio processing functions.

The PS encoder 7 generates—based on the stereo audio input signal L, R—the audio signal DM and the PS parameters 5. Optionally, the PS encoder 7 further uses a radio signal strength signal 6. The audio signal DM is a mono downmix and preferably corresponds to the received mid signal. When summing the L/R channels to form the DM signal, the information of the received side channel is excluded in the DM signal. Thus, in this case only the mid information is contained in the mono downmix DM. Hence, any noise from the side channel may be excluded in the DM signal. However, the side channel is part of the stereo parameter analysis in the encoder 7 as the encoder 7 typically takes L=M+S and R=M−S as input (consequently, DM=(L+R)/2=M).

The mono signal DM and the PS parameters 5 are subsequently used in the PS decoder 8 to reconstruct the stereo signal L', R' (typically with less noise compared to the original stereo signal L, R).

Figure 4:
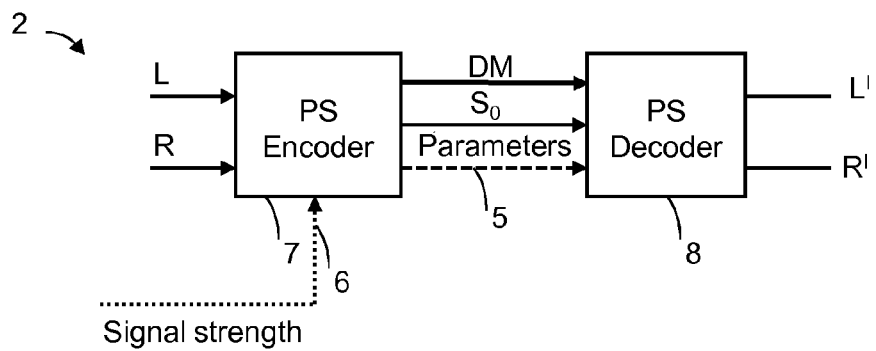
FIG. 4 illustrates an extended version of the audio processing apparatus of FIG. 3.

FIG. 4 shows an extended version of the audio processing apparatus 2 of FIG. 3. Here, in addition to the mono downmix signal DM and the PS parameters also the originally received side signal $S_O$ is passed on to the PS decoder 8. This approach is similar to "residual coding" techniques from PS coding, and allows to make use of at least parts (e.g. certain frequency bands) of the received side signal $S_O$ in case of good but not perfect reception conditions. The received side signal $S_O$ is preferably used in case the mono downmix signal corresponds to the mid signal. However, in case the mono downmix signal does not correspond to the mid signal, a more generic residual signal can be used instead of the received side signal $S_O$. Such a residual signal indicates the error associated with representing original channels by their downmix and PS parameters and is often used in PS encoding schemes. In the following, the remarks to the use of the received side signal $S_O$ apply also to a residual signal.

Figure 5:
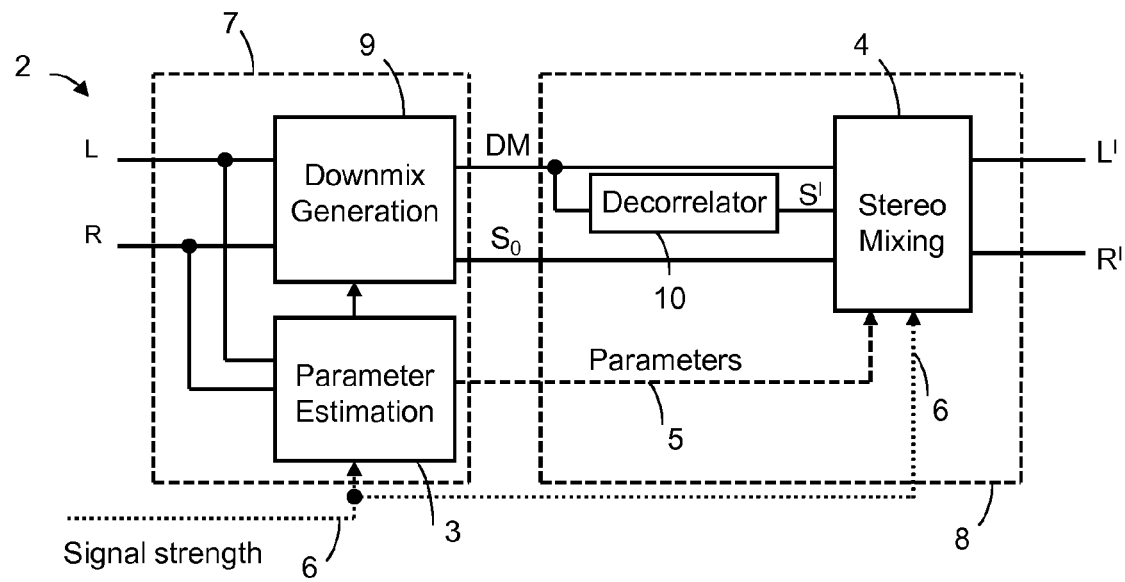
FIG. 5 illustrates an embodiment of the PS encoder and the PS decoder of FIG. 4.

FIG. 5 shows details of an embodiment of the PS encoder 7 and the PS decoder 8 of FIG. 4. The PS encoder module 7 comprises a downmix generator 9 and a PS parameter estimation unit 3. E.g. the downmix generator 9 may create a mono downmix DM which preferably corresponds to a mid signal M (e.g. DM=M=(L+R)/d) and may optionally also generate a second signal which corresponds to the received side signal $S_O$=(L−R)/d.

The PS parameter estimation unit 3 may estimate as PS parameters 5 the correlation and the level difference between the L and R inputs. Optionally, the parameter estimation unit receives the signal strength 6. This information can be used to decide about the reliability of the PS parameters 5. In case of a low reliability, e.g. in case of a low signal strength 6, the PS parameters 5 may be set such that the output signal L', R' is a mono output signal or a pseudo stereo output signal. In case of a mono output signal, the output signal L' is equal to the output signal R'. In case of a pseudo stereo output signal, default PS parameters may be used to generate a pseudo or default stereo output signal L', R'.

The PS decoder module 8 comprises a stereo mixing (or upmix) matrix 4 and a decorrelator 10. The decorrelator receives the mono downmix DM and generates a decorrelated signal S' which is used as a pseudo side signal. The decorrelator 10 may be realized by an appropriate all-pass filter as discussed in section 4 of the cited document "Low Complexity Parametric Stereo Coding in MPEG-4". The stereo mixing matrix 4 is a 2×2 upmix matrix in this embodiment.

Dependent upon the estimated parameters 5, the stereo mixing matrix 4 mixes the DM signal with the received side signal $S_O$ or the decorrelated signal S' to create the stereo output signals L' and R'. The selection between the received signal $S_O$ and the decorrelated signal S' may depend on a radio reception indicator indicative of the reception conditions, such as the signal strength 6. One may instead or in addition use a quality indicator indicative of the quality of the received side signal. One example of such a quality indicator may be an estimated noise (power) of the received side signal. In case of a side signal comprising a high degree of noise, the decorrelated signal S' may be used to create the stereo output signal L' and R', whereas in low noise situations, the side signal $S_O$ may be used.

The upmix operation is preferably carried out according to the following matrix equation:

$$\begin{pmatrix} L' \\ R' \end{pmatrix} = \begin{pmatrix} \varepsilon & \beta \\ \gamma & \delta \end{pmatrix} \begin{pmatrix} DM \\ S \end{pmatrix}$$

Here, the weighting factors $\varepsilon$, $\beta$, $\gamma$, $\delta$ determine the weighting of the signals DM and S. The downmix signal DM preferably corresponds to the received mid signal. The signal S in the formula corresponds either to the decorrelated signal S' or to the received side signal $S_O$. The upmix matrix elements, i.e. the weighting factors $\varepsilon$, $\beta$, $\gamma$, $\delta$, may be derived e.g. as shown the cited paper "Low Complexity Parametric Stereo Coding in MPEG-4" (see section 2.2), as shown in the cited MPEG-4 standardization document ISO/IEC 14496-3:2005 (see section 8.6.4.6.2) or as shown in MPEG Surround specification document ISO/IEC 23003-1 (see section 6.5.3.2). These sections of the documents (and also sections referred to in these sections) are hereby incorporated by reference for all purposes. As such, the weighting factors $\varepsilon$, $\beta$, $\gamma$, $\delta$ may be derived using the PS parameters 5 determined within the parameter estimation unit 3.

In certain reception conditions, the FM receiver 1 only provides a mono signal, with the conveyed side signal being muted. This will typically happen when the reception conditions are very bad and the side signal is very noisy or not decodable from the stereo multiplex signal because the 19 kHz pilot tone required to demodulate the side signal is too weak or not at all present. In case the FM stereo receiver 1 has switched to mono playback of the stereo radio signal, the upmix unit preferably uses upmix parameters for blind upmix, such as preset upmix parameters (or (most) recent upmix parameters), and generates a pseudo stereo signal, i.e. the upmix unit generates a stereo signal using the upmix parameters for blind upmix. There may also exist embodiments of the FM stereo receiver 1 which switch, at too poor reception conditions, to mono playback.

As outlined in the context of FIG. 4 "residual coding" techniques known from PS may be used to improve the quality of the output of the PS decoder 8. By way of example, the radio signal strength 6 may be used as an indicator in order to decide if at least parts of the originally received side signal $S_O$ should be used within the PS encoder for determining the stereo signal L',R'. However, experiments using only the radio signal strength indicator (RSSI) information, which may be available from an FM receiver, in order to control the use of the originally received side signal $S_O$ indicate that the use of the RSSI requires a relatively complex system design and does not achieve an appropriate perceptual performance.

Hence, it is desirable to provide a detector for high quality (HQ) reception of the received side signal $S_O$ that allows for a system design having reduced complexity and that results in improved perceptual performance. In particular, it is desirable that a HQ reception condition detector only takes the received stereo signal, i.e. the output signals L, R (or M, S) of the FM Receiver 1 as input. Furthermore, such a HQ reception condition detector should be robust (e.g. it should work in various reception conditions and for various types of audio signals). Furthermore, the HQ reception condition detector should be constructed in such a way that the achieved perceptual performance of the complete system (i.e., the system comprising PS based stereo noise reduction in conjunction with an HQ detector controlled bypass) is improved and possibly optimized.

Figure 6:
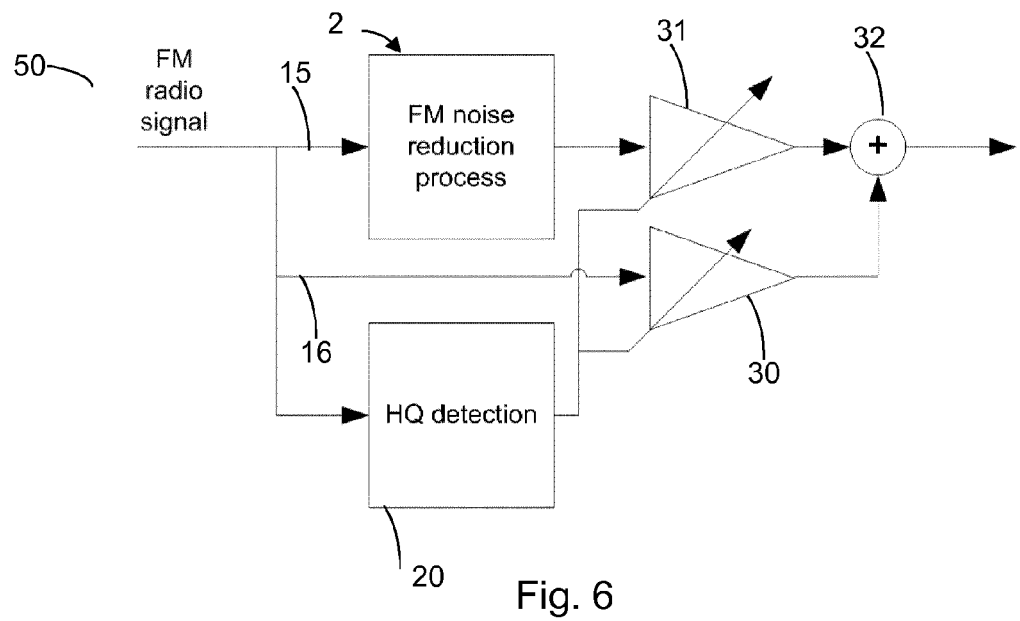
FIG. 6 illustrates an example block diagram of an improved system for processing received FM radio signals.

FIG. 6 illustrates an example block diagram of a system 50 for processing an FM radio signal. The system 50 comprises a PS signal processing path 15 and a bypass path 16. The PS signal processing path 15 comprises a PS audio processing apparatus 2 (or PS processing unit 2) as described e.g. in FIGS. 1 to 5. The PS audio processing apparatus 2 is configured to generate a stereo signal L', R' from the (possibly deteriorated) received FM stereo signal L, R (or M, S). The generated stereo signal L', R' is passed to the PS gain unit 31. The bypass path 16 provides a copy of the received FM stereo signal L, R to the bypass gain unit 30. The gain units 30, 31 generate amplified and/or attenuated stereo signals at their output from the stereo signals at their input. The amplified and/or attenuated stereo signals are merged in a merging unit (e.g. an adding unit) 32. The merging unit 32 is configured to combine the corresponding signal components coming from the gain units 30, 31. In particular, the merging unit 32 is configured to combine the left signals and the right signals coming from the gain units 30, 31, respectively.

The system 50 further comprises an HQ detection unit 20 which is configured to determine or to estimate the level of the audible noise within the received FM stereo signal L, R (or M, S). The noise level estimate determined within the HQ detection unit 20 is used to blend between the PS processed signal (at the output of the PS processing unit 2) and the original (bypassed) signal (from the bypass path 16). For blending the signals on the two signal paths 15, 16, the HQ detection unit 20 may be configured to set the gain values of the PS gain unit 31 and the bypass gain unit 30. Alternatively or in addition, the blending of the signals on the two signal paths 15, 16 may be achieved by interpolating (linearly or non-linearly) the signals on the two signal paths 15, 16. Alternatively, one of the signals on the two signal paths 15, 16 may be selected based on the estimate of the level of the audible noise determined within the HQ detection unit 20.

In the following, a novel approach of discriminating noise (that is introduced by the radio transmission) from the actual payload signal is described. In other words, a method is described how the HQ detection unit 20 may estimate the actual level of noise within the received FM stereo signal and to thereby decide whether to put more emphasis on the output signal of the PS processing unit 2 (in case of higher noise) or to put more emphasis on the bypass signal (in case of lower noise).

In order to discriminate between noise and the actual payload signal, it is assumed that the received side signal S predominantly contains noise if the side signal S is significantly stronger than the received mid signal M. In other words, it is assumed that if the power of the side signal S exceeds the power of the mid signal M by a pre-determined threshold, the power of the side signal S is mainly due to noise. Hence, the Signal-to-Noise Ratio (SNR) of the received stereo signal M, S can be approximated as the Mid-to-Side Ratio (MSR) for low MSR values:

$$SNR(k) \approx MSR = \frac{E\{m_k^2\}}{E\{s_k^2\}},$$

if $$MSR < MSR\_THRESHOLD$$

for every frequency band k. The MSR_THRESHOLD may be set to e.g. −6 dB. In other words, if the ratio of the energy $E\{s_k^2\}$ in the frequency band k of the side signal S exceeds the energy $E\{m_k^2\}$ in the frequency band k of the mid signal M by a pre-determined threshold (e.g. +6 dB), the MSR may be considered to be equal or approximate to the SNR in the frequency band k, thereby providing a reliable estimate of the noise comprised within the received FM stereo signal.

The k=1, . . . , K frequency bands can be derived e.g. from a Quadrature Mirror Filterbank (QMF) analysis stage as used in an High Efficiency Advanced Audio Coder (HE-AAC), where K=64 channels of QMF audio data are used for processing. Optionally, the QMF bank can be provided with a further enhanced frequency resolution, e.g. by splitting the lower QMF bands into a higher number of bands using additional filters. By way of example, the $K_{low}$ frequency bands of a QMF bank may be split up into $p \cdot K_{low}$ frequency bands by using p additional bandpass filters within each of the $K_{low}$ frequency bands (in an example $K_{low}$=16 and p=2). Such hybrid filter structures are used in the PS component that is part of HE-AAC v2. Furthermore, the hybrid filter structures may also be used within the PS audio processing apparatus 2. This means that when using the present system 50 for enhancing a received FM radio stereo signal in conjunction with Coding/Decoding systems which perform a frequency analysis of the FM radio stereo signal (such as HE-AAC or HE-AAC v2 or the PS processing performed within the PS audio processing apparatus 2), the MSRs per frequency band k can be determined with only little additional computational complexity.

It should be noted that the QMF or hybrid QMF bands may advantageously be grouped into a reduced number of frequency bands which correspond e.g. to a non-uniform perceptibly motivated scale, e.g. the Bark scale. As such, the MSRs can be determined for a plurality of frequency bands, wherein the resolution of the plurality of frequency bands is perceptually motivated. By way of example, a QMF filterbank may comprise 64 QMF bands or a hybrid QMF filterbank may comprise 71 bands. The resolution of these filterbanks is typically overly high in the high frequency range. As such, it may be beneficial to group some of the bands in a perceptually motivated manner. Typically, the parameters in PS correspond to such grouped (perceptually motivated) frequency bands and a vector of in time consecutive (hybrid QMF) samples (i.e., a "tile" in the time/frequency-plane). By way of example, the PS parameters may be determined using a total of 20 grouped QMF frequency bands within a time window corresponding to a signal frame (comprising e.g. 2048 samples in the case of HE-AAC). The same frequency or parameter bands used for parametric stereo, may also be used for determining the MSR values per frequency/parameter bands, thereby reducing the overall computational complexity.

The power of a parameter band k for the mid signal M and for a certain given point in time n can be calculated as the expectation value:

$$E\{m_k^2\} = \frac{1}{N}\sum_{n=n_1}^{n_1+N-1} m_{k,n}^2,$$

where a rectangular window located between time instants or samples $n_1$ and $n_1+N-1$ is used. It should be noted that other window shapes may be used to determine the expectation value. Alternative time/frequency representations (other than QMF) can also be used such as a Discrete Fourier Transform (DFT) or other transforms. Also in that case the frequency coefficients may be grouped into fewer (perceptually motivated) parameter bands.

When the side signal S is not stronger than the mid signal M (or not stronger by the factor MSR_THRESHOLD), an SNR estimate is typically not available using the MSR. In other words, when the side signal S is not stronger than the mid signal M (or not stronger by the factor MSR_THRESHOLD), the MSR is typically not a good estimate of the SNR. In this case, an SNR may be determined based on one or more former estimates of the SNR. This may be done in a similar manner as done in advanced noise reduction systems for speech communication where a noise profile is measured during the speech pauses. By way of example, it may be assumed that the power of the noise within the side signal S at a time instant where the MSR is greater or equal to the MSR_THRESHOLD corresponds to (e.g. is equal to) the power of the noise within the side signal S at a preceding time instant where the MSR was smaller than the MSR_THRESHOLD. This assumption may be made separately for each frequency (or parameter) band k. In other words, if at time instant n the ratio of the energy $E\{s_k^2\}$ in the frequency band k of the side signal S does not exceed the energy $E\{m_k^2\}$ in the frequency band k of the mid signal M by the pre-determined threshold, the energy of the noise at time instant n may be estimated as the energy $E\{s_k^2\}$ in the frequency band k of the side signal S at a previous time instant, when the above mentioned condition was met. Alternatively or in addition, the energy of the noise in a frequency band k may be estimated by the energy of the side signal S within a neighboring frequency band (possibly compensated by a typical slope of the power spectrum of the noise within the side signal).

As will be outlined in the following, the use of energy values $E\{s_k^2\}$ at preceding time instants when the MSR value is greater or equal to the MSR_THRESHOLD may be implemented by applying a smoothening or decay function as described in the context of step 104 of FIG. 13.

Figure 7:
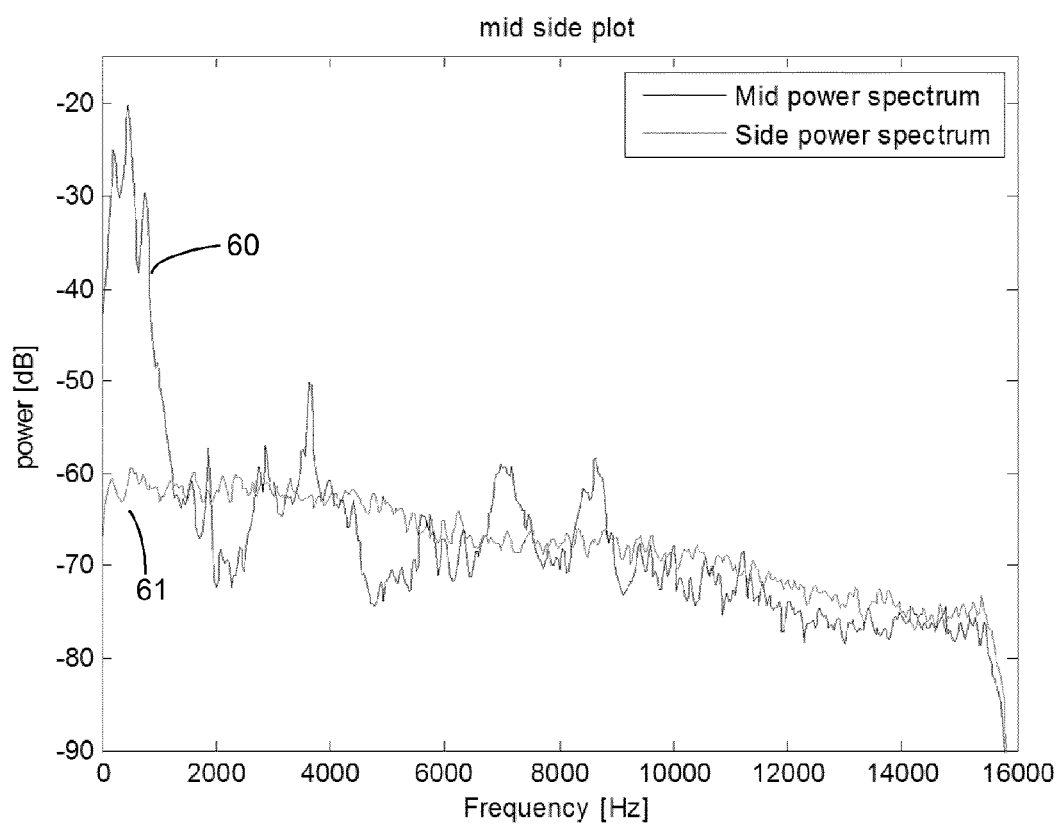
FIG. 7 shows example power spectra for the mid and side signal of a noisy FM radio speech signal.

FIG. 7 shows the power spectrum for a mid signal 60 and the power spectrum for a side signal 61 in a noisy FM radio reception condition. For the frequency bands with a strong dominating mid signal M, it is ambiguous whether the side signal S is noise or not. The side signal S could e.g. be part of an ambience signal or part of a panned signal. Consequently, these frequency bands typically do not provide a reliable indication of the power of the noise within the received FM stereo signal L, R (or M, S). However, looking at the frequency bands where the side signal S is significantly stronger than the mid signal M (e.g. by at least 6 dB or by almost 10 dB), this may be taken as a very likely indication of essentially pure noise within the side signal S caused by the radio transmission. Such a situation, where $E\{s_k^2\} \gg E\{m_k^2\}$, can be seen in FIG. 7 at approx. 2 kHz and 5 kHz. As such, the minimum of the MSRs across the frequency bands k=1, ..., K may be considered to be a reliable indicator of the SNR of the received FM radio signal, i.e. of the quality of the overall received FM radio stereo signal.

Figure 8:
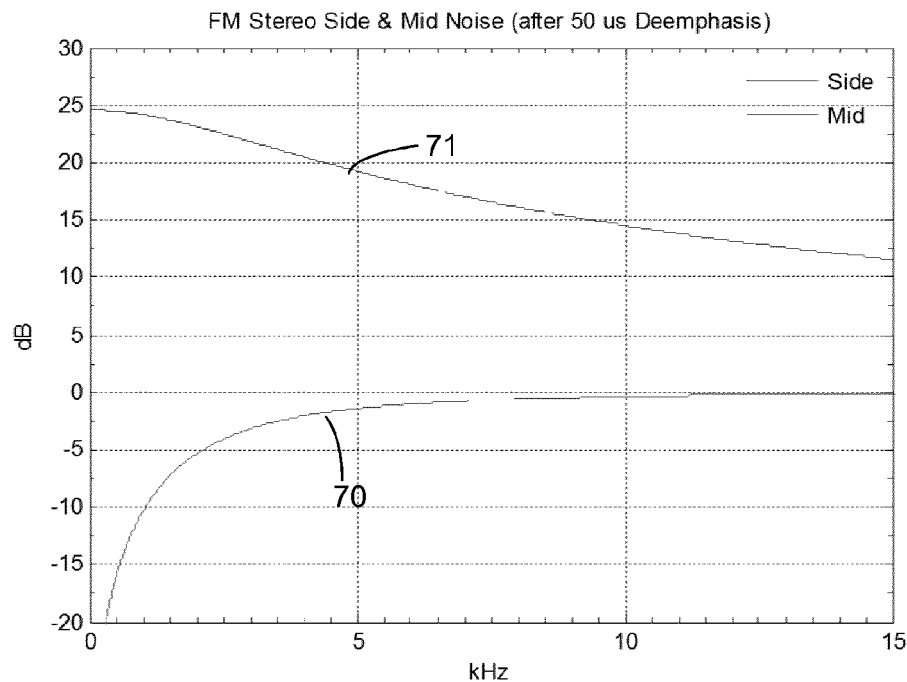
FIG. 8 shows an example mid and side signal noise spectrum after FM stereo decoding for an AWGN (additive white Gaussian noise) radio channel (assuming transmission of silence as payload signal)

When a stereo FM transmitter transmits silence as a payload signal, and when the radio transmission channel is modeled as a channel with additive white Gaussian noise (AWGN), the received stereo signal (after FM demodulation, stereo decoding, and de-emphasis) contains noise in the mid and side signals. Due to the frequency modulation technique used in the FM stereo system, more noise is generated for higher frequencies in the base band than for lower frequencies. Consequently, more noise is generated on the sub-carrier higher up in the base band (at 38 kHz) which contains the side signal. This underlying noise characteristic should be combined with the standardized pre/de-emphasis system used within FM radio transmission systems in order to compensate for the underlying noise characteristic. As a result, the total noise spectra of the mid signal 70 and the side signal 71 as shown in FIG. 8 are obtained (when assuming the transmission of silence of a radio transmission channel which generates AWGN). As can be observed, the side signal noise 71 typically exceeds the mid signal noise 70 by at least 10 dB (for high frequencies) and up to more than 30 dB (for low frequencies). This means that the payload signal in the mid signal should add a significant amount of power covering the whole frequency range in order to perceptually mask all the noise from the side signal. If this is not the case, the side signal noise will typically be audible in the received FM radio stereo signal.

Audio content such as music or speech typically has less payload energy in the high frequency range than in the low frequency range. Furthermore, the payload energy in the high frequency range may be less continuous than in the low frequency range. As such, the energy of the noise of a received FM signal may be more easily detected within the high frequency range than in the low frequency range. In view of this, it may be beneficial to limit the analysis of the MSRs to a selected sub-range of the total K frequency bands. In particular, it may be beneficial to limit the analysis of the MSRs to the upper sub-range of the total K frequency bands, e.g. to the upper half of the K frequency bands. As such, the method for detecting the quality of the received FM signal may be made more robust.

In view of the above, a high quality factor $\alpha_{HQ}$ may be defined which depends on an analysis of MSRs across some or all of the frequency bands k=1, ..., K (e.g. across the high frequency bands). The high quality factor $\alpha_{HQ}$ may be used as an indicator of the audible noise within the received FM radio stereo signal. A high quality signal with no noise may be indicated by $\alpha_{HQ}=1$ and a low quality signal with high noise may be indicated by $\alpha_{HQ}=0$. Intermediate quality states may be indicated by $0<\alpha_{HQ}<1$. The high quality factor $\alpha_{HQ}$ can be derived from the MSR values according to:

$$\alpha_{HQ} = \begin{cases} 0, & \text{if } q < \text{MSR\_LOW} \\ 1, & \text{if } q > \text{MSR\_HIGH} \\ \dfrac{q - \text{MSR\_LOW}}{\text{MSR\_HIGH} - \text{MSR\_LOW}}, & \text{otherwise,} \end{cases}$$

where the MSR thresholds MSR_LOW and MSR_HIGH are pre-determined normalization thresholds and can be chosen in an example as −6 dB and −3 dB, respectively. As a result of such normalization, it is ensured that the high quality factor $\alpha_{HQ}$ takes on values between 0 and 1.

In the above formula, q is a value derived from one or more MSR values. As indicated above, q may be derived from the minimum MSR value across a subset of the frequency bands. Furthermore, q could be set as an inverted peak-decay value of the minimum MSR value. Alternatively or in addition, any other smoothing method could be used to smoothen the evolution of the quality indicator parameter q across time.

The high quality factor $\alpha_{HQ}$ can be used for switching or fading or interpolating between the PS processed stereo signal on the PS processing path 15 and the original unprocessed FM radio stereo signal on the bypass path 16. An example fading formula is given by $$\begin{pmatrix} L_{out} \\ R_{out} \end{pmatrix} = \alpha_{HQ} \begin{pmatrix} L_{FM} \\ R_{FM} \end{pmatrix} + (1 - \alpha_{HQ}) \begin{pmatrix} L_{PS} \\ R_{PS} \end{pmatrix}.$$

This means that the high quality factor $\alpha_{HQ}$ may be used as the gain for the bypass gain unit 30, whereas the factor $(1-\alpha_{HQ})$ may be used as the gain for the PS gain unit 31.

Figure 13:
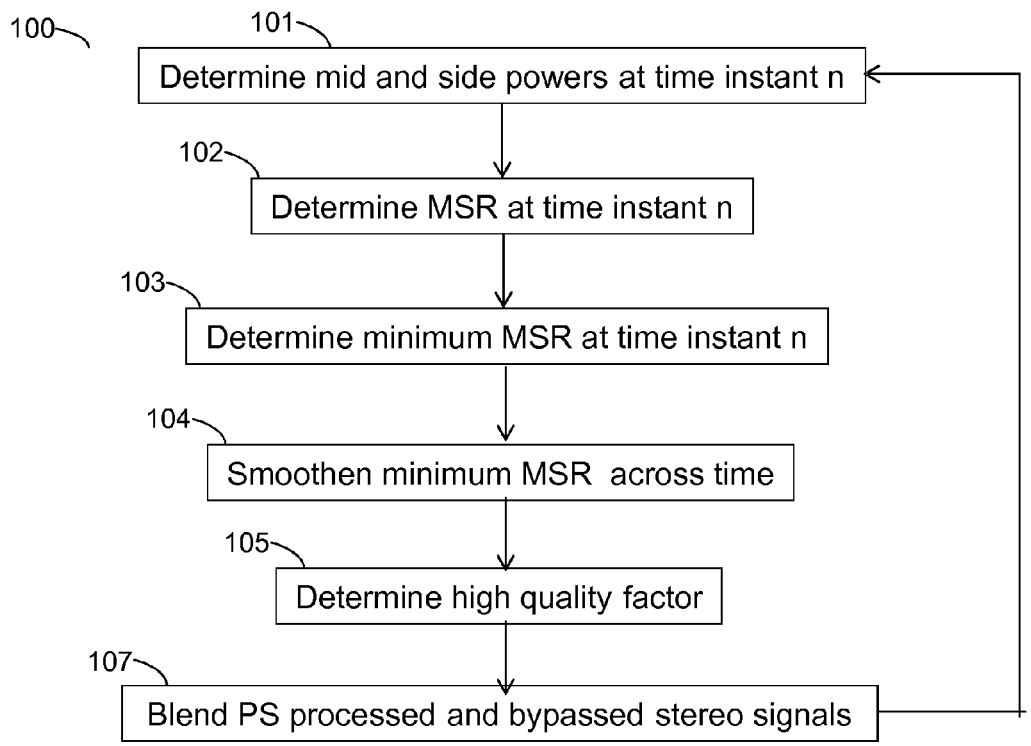
FIG. 13 illustrates an example flow chart of an improved method for the processing of received FM radio signals.

An embodiment of an HQ detection algorithm 100 can be described by the following steps shown in FIG. 13:

In a step 101, mid and side signal powers are calculated, i.e. the energy of the mid signal $P_k^M = E\{m_k^2\}$ and the energy of the side signal $P_k^S = E\{s_k^2\}$ are determined for some or all of the frequency bands k, e.g. $K_{low} < k \leq K_{high}$. In an example $K_{high} = K$ and $K_{low} = K/2$ (i.e. only the upper half of the frequency bands is considered). The mid and side powers $P_k^M$ and $P_k^S$ are determined at a time instant n, e.g. using the averaging formula for the expectation value provided above.

In a step 102, the Mid to Side Ratio (MSR) values for the some or all of the frequency bands k is determined, e.g. as, $$\gamma = 10\log_{10}\left(\frac{P_k^M}{P_k^S}\right).$$

In a step 103, the minimum MSR value $$\gamma_{min} = \min_k(\gamma_k)$$

for a certain frequency range is determined, wherein the frequency range is e.g. $K_{low} < k \leq K_{high}$.

In a step 104, the minimum MSR values are smoothened across the time, e.g. by determining an MSR peak value as $\gamma_{peak}(n) = \min(\kappa\gamma_{peak}(n-1), \gamma_{min})$, with a decay factor $\kappa = \exp(-1/(F_s\tau))$ with a time constant of e.g. $\tau = 2$ seconds and with $F_s$ being the sampling frequency, e.g. the frame rate, i.e. the rate how frequently step 104 is carried out. This implements an inverted peak-decay function which smoothens the minimum MSR values across the time.

In a step 105, the high quality factor $\alpha_{HQ}$ at time instant n is determined by using the MSR peak value $\gamma_{peak}(n)$ at time instant n, i.e. by using the smoothened minimum MSR value at time instant n, with $q = \gamma_{peak}(n)$ as $$\alpha_{HQ} = \begin{cases} 0, & \text{if } q < \text{MSR\_LOW} \\ 1, & \text{if } q > \text{MSR\_HIGH} \\ \frac{q - \text{MSR\_LOW}}{\text{MSR\_HIGH} - \text{MSR\_LOW}}, & \text{otherwise.} \end{cases}$$

As indicated above, the MSR thresholds may be set as e.g. MSR_LOW=−6 dB and MSR_HIGH=−3 dB.

In a step 107, the high quality factor $\alpha_{HQ}$ at time instant n may be applied to the PS processing/bypass blending process illustrated in FIG. 6, e.g. by setting:

$$\begin{pmatrix} L_{out} \\ R_{out} \end{pmatrix} = \alpha_{HQ} \begin{pmatrix} L_{FM} \\ R_{FM} \end{pmatrix} + (1 - \alpha_{HQ}) \begin{pmatrix} L_{PS} \\ R_{PS} \end{pmatrix}.$$

The above mentioned HQ detection algorithm 100 may be iterated for succeeding time instants (illustrated by the arrow from step 107 back to step 101.

The method or system for determining a high quality of the received FM radio stereo signal may be further improved by making the high quality factor $\alpha_{HQ}$ dependent on one or more further noise indicators (in addition to the one or more MSR values). In particular, the high quality factor $\alpha_{HQ}$ may be made dependent on a Spectral Flatness Measure (SFM) of the received FM radio stereo signal. As outlined in WO PCT/EP2011/064077, a so called SFM_impact_factor which is normalized between 0 and 1 may be determined. A SFM_impact_factor=0 may correspond to a low SFM value indicating a power spectrum of the side signal S for which the spectral power is concentrated in a relatively small number of frequency bands. I.e. a SFM impact factor of "0" indicates a low level of noise. On the other hand, a SFM impact factor of "1" corresponds to a high SFM value indicating that the spectrum has a similar amount of power in all spectral bands. Consequently, an SFM impact factor of "1" indicates a high level of noise.

A modified high quality factor $\alpha'_{HQ}$ may be determined according to:

$\alpha_{HQ}' = (1 - \text{SFM\_impact\_factor}) * \alpha_{HQ}$, thereby emphasizing a high quality factor $\alpha'_{HQ} = 0$ (indicating a low quality, i.e. a high degree of noise) if the SFM_impact_factor=1 (indicating a high level of noise within the received FM radio stereo signal) and vice versa. It should be noted that the above mentioned formula for combining the effects of the MSR based high quality factor $\alpha_{HQ}$ and the SFM is only one possible way of combining the two noise indicators to a joint (modified) high quality factor $\alpha'_{HQ}$. The SFM_impact_factor may be beneficial to detect noise cases where both mid and side signals have rather flat spectra and are close in energy. In such cases, the minimum MSR value $\gamma_{min}$ is typically close to 0 dB despite a significant amount of audible noise within the received FM radio stereo signal. The modified high quality factor $\alpha'_{HQ}$ may replace the high quality factor $\alpha_{HQ}$ in the PS processing/bypass blending process described above.

In the following, examples for determining a SFM_impact_factor are outlined. In typical received FM radio stereo signals, the power spectrum of the mid signal M is relatively steep with high levels of energy in the lower frequency range. On the other hand, the side signal S typically has an overall low degree of energy and a relatively flat power spectrum.

Since the power spectrum of the side signal noise is rather flat and has a characteristic slope, the SFM together with slope compensation may be used to estimate the noise level within the received FM signal. Different types of SFM values may be used. I.e. the SFM values may be calculated in various manners. In particular, the instantaneous SFM value, as well as a smoothed version of the SFM may be used. The instantaneous SFM value typically corresponds to the SFM of a signal frame of the side signal, whereas the smoothed version of the instantaneous SFM value also depends on the SFM of previous signal frames of the side signal.

A method for determining an impact factor from the side signal may comprise the step of determining the power spectrum of the side signal. Typically, this is done using a certain number of samples (e.g. the samples of a signal frame) of the side signal. The power spectrum may be determined as the energy values of the side signal $P_k^S = E\{s_k^2\}$ for a plurality of frequency bands k, e.g. k=1, ..., K. The determination period of the power spectrum may be aligned with the period for determining PS parameters. As such, a power spectrum of the side signal may be determined for the validity period of the corresponding PS parameters.

In a subsequent step, the characteristic slope of the power spectrum of side signal noise may be compensated. The characteristic slope may be determined experimentally (at a design/tuning phase), e.g. by determining the average power spectrum of the side signals of a set of mono signals. Alternatively or in addition, the characteristic slope may be determined adaptively from the current side signal, e.g. using linear regression on the power spectrum of the current side signal. The compensation of the characteristic slope may be performed by an inverse noise slope filter. As a result, a slope compensated, possibly flat, power spectrum should be obtained, which does not exhibit the characteristic slope of the power spectrum of a side signal of a mono speech audio signal.

Using the (slope compensated) power spectrum, an SFM value may be determined. The SFM may be calculated according to $$SFM = \frac{\left(\prod_{k=0}^{N-1} E\{s_k^2\}\right)^{1/N}}{\frac{1}{N}\sum_{k=0}^{N-1} E\{s_k^2\}}$$

wherein $E\{s_k^2\}$ denotes the power of the side signal in frequency band k, e.g. in the hybrid filterbank band k. The hybrid filterbank used in the example PS system consists of 64 QMF bands, where the 3 lowest bands are further divided into 4+2+2 bands (hence, N=64−3+4+2+2=69). The SFM may be described as the ratio between the geometric mean of the power spectrum and the arithmetic mean of the power spectrum.

Alternatively, the SFM may be calculated on a subset of the spectrum, only including the hybrid filterbank bands ranging from $K_{low}$ to $K_{high}$. That way e.g. one or a few of the first bands can be excluded in order to remove an unwanted DC, e.g. low frequency, offset. When adjusting the band borders the above mentioned formula for calculating the SFM should be amended accordingly.

For reasons of limiting the computational complexity, the SFM formula may alternatively be replaced by numerical approximations of it based on e.g. a Taylor expansion, look-up table, or similar techniques commonly known by experts in the field of software implementations. Furthermore, there are also other methods of measuring spectral flatness, such as e.g. the standard deviation or the difference between minimum and maximum of the frequency power bins, etc. In the present document, the term "SFM" denotes any of these measures.

Using the SFM value for the particular time period or frame of the side signal, an impact factor can be determined. For this purpose, the SFM is mapped, e.g. onto a scale of 0 to 1. The mapping and the determination of an SFM impact factor may be performed according to $$SFM\_impact\_factor = \begin{cases} 0, & SFM < \alpha_{low\_thresh} \\ \frac{SFM - \alpha_{low\_thresh}}{\alpha_{high\_thresh} - \alpha_{low\_thresh}}, & \alpha_{low\_thresh} \leq SFM \leq \alpha_{high\_thresh} \\ 1, & SFM > \alpha_{high\_thresh} \end{cases}$$

wherein the two threshold values $\alpha_{low\_thresh}$ and $\alpha_{high\_thresh}$ are selected in accordance to the average range of SFM values which are typically ranging from 0.2 to 0.8. The main purpose of the normalization stage is to ensure that the SFM impact factor regularly spans the complete region between "0" and "1". As such, the normalization ensures that a "normal" unflat spectrum (SFM<$\alpha_{low\_thresh}$) is not detected as noise and that the measure saturates for high values (SFM>$\alpha_{high\_thresh}$). In other words, the normalization provides an impact factor which more clearly distinguishes between high noise situations (SFM>$\alpha_{high\_thresh}$) and low noise situations (SFM<$\alpha_{low\_thresh}$).

In the following another option for enhancing the methods and systems for HQ detection outlined in the present document is described. A modified high quality factor $\alpha'_{HQ}$ may be determined by affecting the high quality factor $\alpha_{HQ}$ by the total side level $S_{sum}$ as a soft noise gate, i.e. the total level (i.e. the energy or power) of the side signal which may be determined as the energy of the side signal (across all frequency bands). As such, the modified high quality factor $\alpha'_{HQ}$ may be determined according to:

$$\alpha'_{HQ} = g_{gate}\alpha_{HQ}, \text{ where}$$

$$g_{gate} = \begin{cases} 0, & \text{if } S_{sum} < S\_THRES\_LOW \\ 1, & \text{if } S_{sum} > S\_THRES\_HIGH \\ \frac{S_{sum} - S\_THRES\_LOW}{S\_THRES\_HIGH - S\_THRES\_LOW}, & \text{otherwise} \end{cases}$$

The thresholds S_THRES_LOW and S_THRES_HIGH may be used to normalize the gate factor $g_{gate}$ to values between 0 and 1. FM signals with side signals which have a level $S_{sum}$<S_THRES_LOW are considered to be of low quality, whereas FM signals with side signals which have a level $S_{sum}$>S_THRES_HIGH may be of high quality.

Another option for providing an enhanced HQ detection algorithm is to let the high quality factor $\alpha_{HQ}$ be affected by the output of a concealment detector as described e.g. in WO PCT/EP2011/064084. A modified high quality factor $\alpha'_{HQ}$ may be determined by taking into account if concealment is active within the PS processing path 15, in order to conceal undesirable mono dropout situations of the FM receiver. The modified high quality factor $\alpha'_{HQ}$ may be determined according to $\alpha'_{HQ} = (1 - \delta_{conceal})\alpha_{HQ}$, where $\delta_{conceal}=1$ if concealment is active, and where otherwise $\delta_{conceal}=0$. This means that a received FM radio signal is certainly considered to be of low quality ($\alpha'_{HQ}=0$) if the concealment is active within the PS processing unit 2, otherwise the quality of the received FM radio signal is estimated based on the calculated value of the high quality factor $\alpha_{HQ}$. In order to avoid (audible) discontinuities when recovering from the concealment state (i.e. $\delta_{conceal}=1$), i.e. in order to ensure a smooth transition of the modified high quality factor $\alpha'_{HQ}$ from 0 to a non-zero value, the minimum MSR value $\gamma_{min}$ may be forced to $\gamma_{min}$=MSR_LOW whenever $\delta_{conceal}$=1, such that the smooth transition is ensured by the smoothing method of step 104 of FIG. 13. As a result of making the high quality factor dependent on the concealment state $\delta_{conceal}$, a fast switching to the PS mode (i.e., a fast transition to FM stereo noise reduction processing for the sudden occurrence of a bad reception condition), and a slow blend back to the bypass mode (when reception conditions have improved) can be implemented.

The use of concealment within the PS processing unit 2 requires the reliable detection of mono dropouts, in order to trigger concealment, i.e. in order to set the concealment state $\delta_{conceal}$ from 0 to 1. A possible mono/stereo detector could be based on detecting mono sections of the signal which meet the condition left signal=right signal (or left signal−right signal=0). Such a mono/stereo detector would, however, lead to an instable behavior for the concealment process, due to the fact that the left signal and right signal energies, as well as the side signal energy, can fluctuate a lot even in healthy reception conditions.

Figure 14:
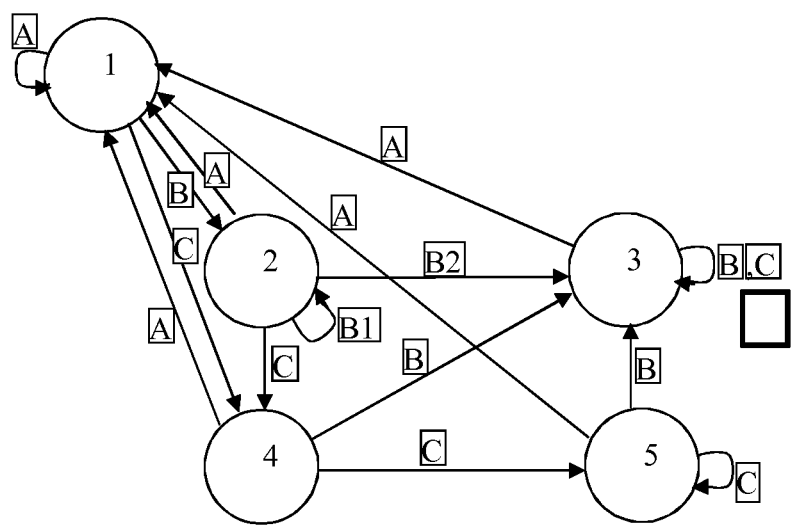
FIG. 14 shows an example state machine used for PS parameter concealment.

In order to avoid such instable behavior of the concealment, the mono/stereo detection and the concealment mechanism could be implemented as a state machine. An example state machine is illustrated in FIG. 14. The state machine of FIG. 14 makes use of two reference levels of the absolute energy of the side signal 5, i.e. $E_S$ (or $P_S$ as defined above). The side signal S used to calculate $E_s$ may have been high pass filtered with a cutoff frequency of typically 250 Hz. These reference levels are an upper reference level ref_high and a lower reference level ref_low. Above the upper reference level (ref_high) the signal is considered to be stereo and below the lower reference levels (ref_low) it is considered to be mono.

The side signal energy $E_S$ is calculated as a control parameter of the state machine. $E_S$ may be calculated over a time window that could e.g. correspond to the time period of validity of the PS parameters. In other words, the frequency of determining the side signal energy may be aligned to the frequency of determining the PS parameters. In this document, the time period for determining the side signal energy $E_S$ (and possibly the PS parameters) is referred to as a signal frame. The state machine of FIG. 14 comprises five conditions, which are verified each time the energy $E_S$ of a new frame is calculated:

Condition A indicates that the side signal energy $E_S$ exceeds the upper reference level ref_high. The upper reference level may be referred to as the higher threshold.

Condition B indicates that the side signal energy $E_S$ is lower than or equal to the upper reference level ref_high and higher than or equal to the lower reference level ref_low. The lower reference level may be referred to as the lower threshold.

Condition B1 corresponds to condition B, but adds an additional time condition. The time condition stipulates that condition B is met less than a threshold number of frames or less than a threshold time. This threshold may be referred to as the frame threshold.

Condition B2 corresponds to condition B, with the additional time condition stipulating that condition B is met more than or equal to the threshold number of frames or more than or equal to the threshold time.

Condition C indicates that the side signal energy $E_S$ is lower than the lower reference level ref_low.

Furthermore, the example state machine of FIG. 14 makes use of five states. The different states are reached subject to the above mentioned conditions and subject to the state diagram illustrated in FIG. 14. The following actions are typically performed in the different states within the PS processing unit 2:

In state 1 normal stereo operation is performed, e.g. based on the PS parameters which are determined from the current audio signal. The concealment state $\delta_{conceal}$ remains at 0.

In state 2 normal stereo operation is performed based on PS parameters determined on the current audio signal. This state is only transitional, in view of the fact that either condition B is met for a number of frames more than or equal to the frame threshold or for a time more than or equal to the time threshold (i.e. condition B2) or prior to this lapse of number of frames or lapse of time, condition A or C is met. The concealment state $\delta_{conceal}$ remains at 0.

In state 3 stereo operation is performed based on PS parameters determined on the current audio signal. It can be seen that state 3 can be reached on a path going from state 1 via state 2 to state 3. In view of the fact that condition B2 requires a minimum number of frames or a minimum amount of time for the transition, the path "state 1, state 2, state 3" represents a slow, i.e. smooth, transition from a normal stereo operation (e.g. music) to a normal mono operation (e.g. speech). The concealment state $\delta_{conceal}$ is set to or remains at 0.

In state 4 mono dropout concealment is started using previously determined PS parameters, e.g. the most recent PS parameters which were determined in state 1. It can be seen that state 4 can be reached from state 1 directly, if condition C is met, i.e. if the side signal energy $E_S$ steeply drops from above ref_high to below ref_low. Alternatively, state 4 can be reached from state 1 via state 2, however, only if condition B is met for only a few number of frames or for only a short period of time. As such, the paths "state 1, state 4" and "state 1, state 2, state 4" represent a fast, i.e. abrupt, transition from a normal stereo operation (e.g. music) to a forced mono operation. The forced mono operation is typically due to the FM receiver which abruptly cuts off the side signal if the level of noise in the side signal exceeds a pre-determined level. The concealment state $\delta_{conceal}$ is set to 1, in order to indicate the use of concealment within the PS processing unit 2.

In state 5 mono dropout concealment is continued e.g. based on the PS parameters which have been established in state 4. In the illustrated embodiment, state 5 can only be reached from state 4 if condition C is met, i.e. state 5 represents the stable mono dropout concealment state, where previously determined PS parameters are used in order to generate a stereo audio signal from a mid signal. The PS parameters may decay to mono with a time constant of a few seconds. The concealment state $\delta_{conceal}$ typically remains at 1.

As already indicated, the illustrated state diagram ensures that concealment is triggered only if the audio signal received by the FM receiver goes from stereo to mono within a few time windows, i.e. if the transition from stereo to mono is abrupt. On the other hand, trigging of concealment is prevented in cases where there is noise in the side signal with energy $E_S$ below stereo level (ref_high) but above mono level (ref_low), i.e. in cases where there is still sufficient information within the side signal to generate appropriate PS parameters. At the same time, even when the signal changes from stereo to mono, e.g. when the signal transits from music to speech, the concealment detection will not be triggered, thereby ensuring that the original mono signal is not rendered into an artificial stereo signal due to the erroneous application of concealment. An authentic transition from stereo to mono can be detected based on a smooth transition of the side signal energy $E_S$ from above ref_high to below ref_low.

In the following, another option for enhancing the HQ detection methods outlined in the present document is described. The MSR values $\gamma_k$ may be adjusted for large Channel Level Differences (CLDs), according to:

$$\gamma'_k = \gamma_k + |CLD| = 10\log_{10}\left(\frac{P_k^M}{P_k^S}\right) + |CLD|.$$

The CLD parameter is a PS parameter which indicates a degree of the panning of the received FM radio stereo signal. The CLD parameter may be determined from the ratio of the energy of the received left side signal L and the received right side signal R, e.g. according to $$CLD = 10 \cdot \log_{10}\left(\frac{P^L}{P^R}\right),$$

with $P^L=E\{L^2\}$ being the energy or power of the received left side signal and $P^R=E\{R^2\}$ being the energy or power of the received right side signal. Consequently, the MSR values $\gamma_k$ are increased for heavily panned signals having a significant energy difference between the left side signal L and the right side signal R. Such a heavy difference between the L and R signals leads to a side signal S having a relatively high energy, even though the side signal S does not comprise noise. By increasing the MSR values $\gamma_k$, the minimum MSR value $\gamma_{min}$ is increased, thereby increasing the high quality factor $\alpha_{HQ}$. Consequently, the use of the CLD parameter helps to avoid false detection of low quality signals from strong side signals S which are due to wide (music) stereo mixes and stereo widening post-processes.

Another option for enhancing the methods for HQ detection outlined in the present document is to let the high quality factor $\alpha_{HQ}$ affect the PS downmix gain, according to:

$$g'_{dmx} = \alpha_{HQ} g_{dmx} + (1-\alpha_{HQ}) \cdot 1.$$

As outlined above, in PS processing unit 2 the downmix signal DM may be used to generate reconstructed left and right signals L', R' from the downmix signal DM. For this purpose, the downmix signal may be energy compensated using a PS downmix gain $g_{dmx}$, such that $DM = g_{dmx} \cdot \frac{1}{2}(L+R)$. The PS downmix gain $g_{dmx}$ may be time variant and/or frequency variant. The PS downmix gain $g_{dmx}$ may be used to implement an energy compensated downmix as used e.g. in an HE-AAC v2 encoder. Typically, the PS downmix gain $g_{dmx}$ is used to compensate for the in-phase or out-of-phase behaviour of the left and right signals L, R. The PS downmix gain $g_{dmx}$ may be used to ensure that the level (or energy or power) of the downmix signal DM corresponds (e.g. is equal to) the sum of the level of the right signal R and the level of the left signal L. The PS downmix gain $g_{dmx}$ may be limited to a maximum gain value (in case of left and right signals L, R which are strongly out-of-phase).

The above mentioned formula for modifying the PS downmix gain $g_{dmx}$ subject to the quality indicator $\alpha_{HQ}$ means that when using the modified downmix gain $g'_{dmx}$ according to the above mentioned formula, the energy compensated downmix scheme is used to a larger extent when the side signal comprises a low degree of noise ($\alpha_{HQ}$ towards 1) and converge to a fixed downmix gain (factor of 1) for noisy signals (when the energy compensation factor is less reliable). In other words, if the received FM signal comprises a high degree of noise, it is proposed to not rely (or to rely less) on the determined PS downmix gain $g_{dmx}$. The modified downmix gain $g'_{dmx}$ can be used e.g. in an HE-AAC v2 encoder.

Similarly, the high quality factor $\alpha_{HQ}$ can be used to adjust the prediction limiting values (i.e., adjusting the parameters a and b in a prediction based FM stereo radio noise reduction scheme). As outlined in PCT/EP2011/064077, an alternative PS parameterization for determining a reconstructed side signal $S_p$ can be determined from the following upmix process:

$$S_p = a^*DM + b^*\text{decorr}(DM), L' = DM + S_p, R' = DM - S_p,$$

where DM is the downmix signal, "a" and "b" are the two new PS parameters, and decorr( ) is the decorrelator, typically an all-pass filter, used in the upmix unit 4. This alternative representation may be referred to as a prediction based scheme, as the side signal is predicted from the DM signal. The parameters a and b may be adjusted using the high quality factor $\alpha_{HQ}$.

In the prediction based FM stereo radio noise reduction scheme, a limitation function of the prediction parameters a and b may be used with a'=a/c; and b'=b/c, where c is a limitation factor and where c=1 results in unmodified parameters a and b. Values of c>1 cause the noise-reduced side signal $S_p$ to be multiplied by 1/c, i.e., to be attenuated by a factor c.

Different approaches to compute the limitation factor c from a and b, i.e., c=f(a,b), are possible. Two possible approaches are:

$$c=\max(1,(a^2+b^2)), \text{ or} \quad (1)$$

$$c=\max(1,\sqrt{(a^2+b^2)}). \quad (2)$$

In a similar manner to letting the quality indicator $\alpha_{HQ}$ limit the dynamics of the PS downmix gain $g_{dmx}$, the limitation factor c may be affected by the quality indicator $\alpha_{HQ}$. This can be done e.g. according to:

$$c=\max(1,(a^2+b^2)^{(1-\alpha_{HQ}+\epsilon)}),$$

where $\epsilon$ is an optional adjustment value (small number) preventing a and b from infinity (or unreasonable large numbers) when the quality indicator $\alpha_{HQ}$=1, i.e. when the received FM signal comprises a low degree of noise.

The purpose of such a limiting function c=f(a, b, $\alpha_{HQ}$), is to limit a and b for a low quality FM signal ($\alpha_{HQ}$ close to zero) while not (or only slightly) limiting a and b for a high quality FM signal ($\alpha_{HQ}$ close to one). It should be noted that the above mentioned function for modifying the limitation factor in dependence of the quality indicator $\alpha_{HQ}$ approximates the first function (1) of c for $\alpha_{HQ}$=0, the second function (2) for $\alpha_{HQ}$=0.5, and "no limiting" of the parameters a and b is performed for $\alpha_{HQ}$=1. Furthermore, it should be noted that the above mentioned formula is only one example of implementing a modified limitation function which takes into account the quality of the received FM signal.

It should be noted that the above mentioned options can be used standalone or in an arbitrary combination with each other.

The methods for HQ detection based on the one or more MSR values are further exemplified in FIG. 9 through FIG. 12. In these Figures the top plots 85 show the minimum MSR values $\gamma_{min}$ 82 (solid line) at a sequence of time instants. The minimum MSR values $\gamma_{min}$ have been determined from the upper 10 out of 20 frequency bands k of a typical PS system. Furthermore, an inverted peak-decay function $\gamma_{peak}$ (n) 83 (dashed line) of the sequence of minimum MSR values $\gamma_{min}$ 82 is shown. The reference MSR levels MSR_LOW=−6 dB (reference numeral 81) and MSR_HIGH=−3 dB (reference numeral 80) are marked as dotted lines.

In these examples, MSR values less than −6 dB indicate audible noise and MSR levels greater than −3 dB indicate no audible noise (i.e. "High Quality"). Inbetween those reference levels, an intermediate fractional high quality factor $\alpha_{HQ}$ is derived using the above mentioned methods and formulas.

The lower plots 86 indicate the frequency band k 84 (between 10 and 20 in the present examples) within which the minimum MSR values 82 have been determined. Furthermore, it may be illustrated by the dots 87 if the minimum MSR in frequency band k is greater than MSR_HIGH.

Figure 9:
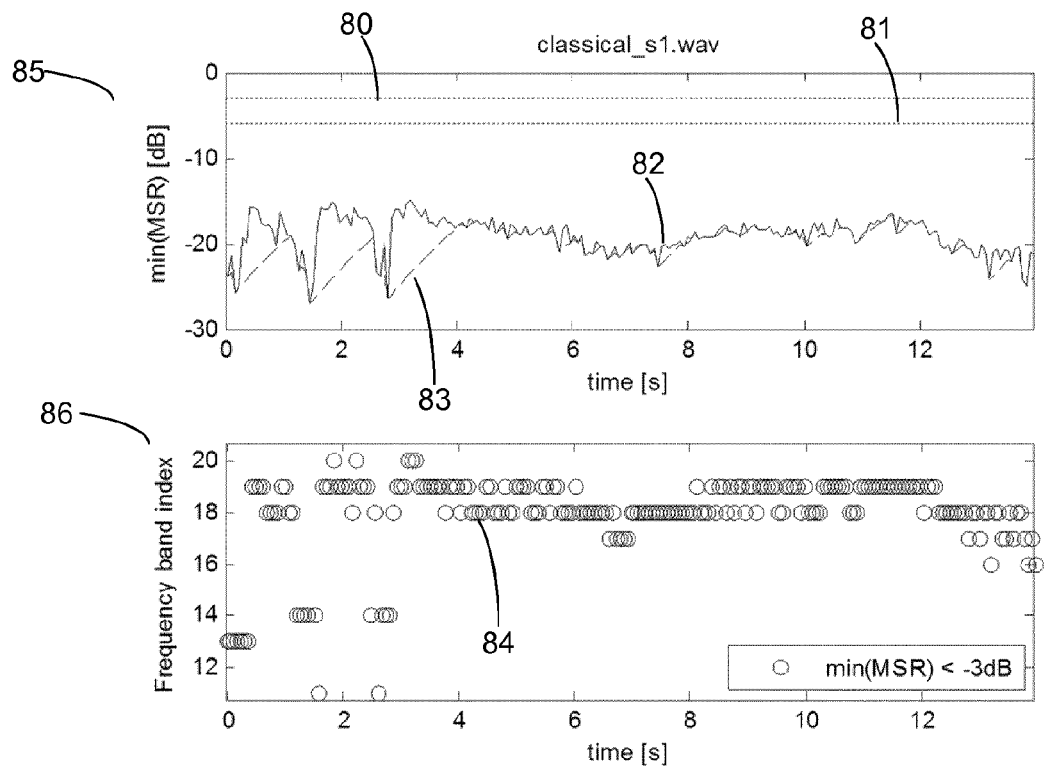
FIGS. 9 to 12 show in the top diagrams example minimum MSR (Mid to Side Ratio) curves, and in the bottom diagrams example indications of the frequency band within which a minimum of the MSR occurs.

In FIG. 9 the received FM radio signal has very low minimum MSR values 82, especially for the higher frequency bands. This is because the signal contains classical orchestral music with only modest amounts of high frequency energy. Therefore, the classical orchestral music does not mask high frequency noise from the side signal very well. In the example of FIG. 9, the minimum MSR values never reaches beyond the lower threshold MSR_LOW and hence the signal is classified by the HQ detection algorithm 100 as non-HQ (i.e. $\alpha_{HQ}=0$) for any given point in time.

Figure 10:
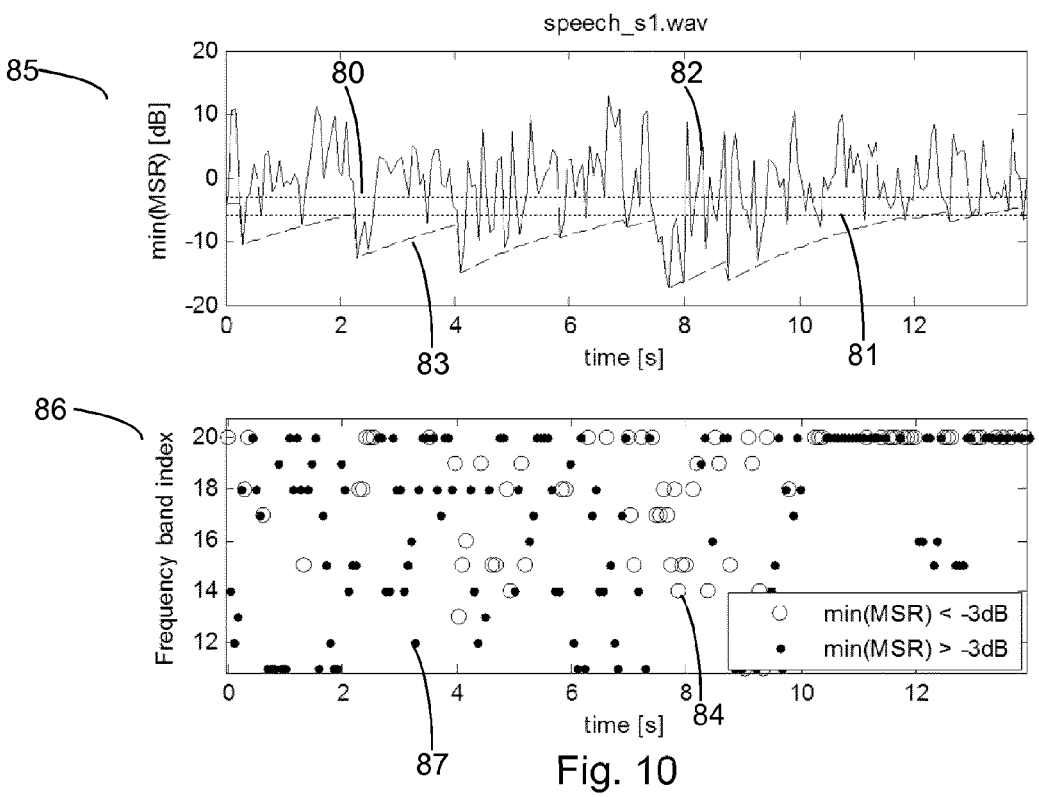

In FIG. 10, the plots 85 and 86 show a typical behavior for speech signals. The minimum MSR values 82 are very low during the speech pauses and otherwise quite high due to typically loud mixing of speech in radio content. The example clearly illustrates the benefits of using a smoothening along the time (e.g. using the inverted peak-decay function). This smoothening has a memory function which keeps the HQ estimate low, thereby preventing a toggling between the PS processing path 15 (during silence) and the bypass path 16 (during the transmission of speech). Such toggling would lead to undesirable acoustic effects.

Figure 11:
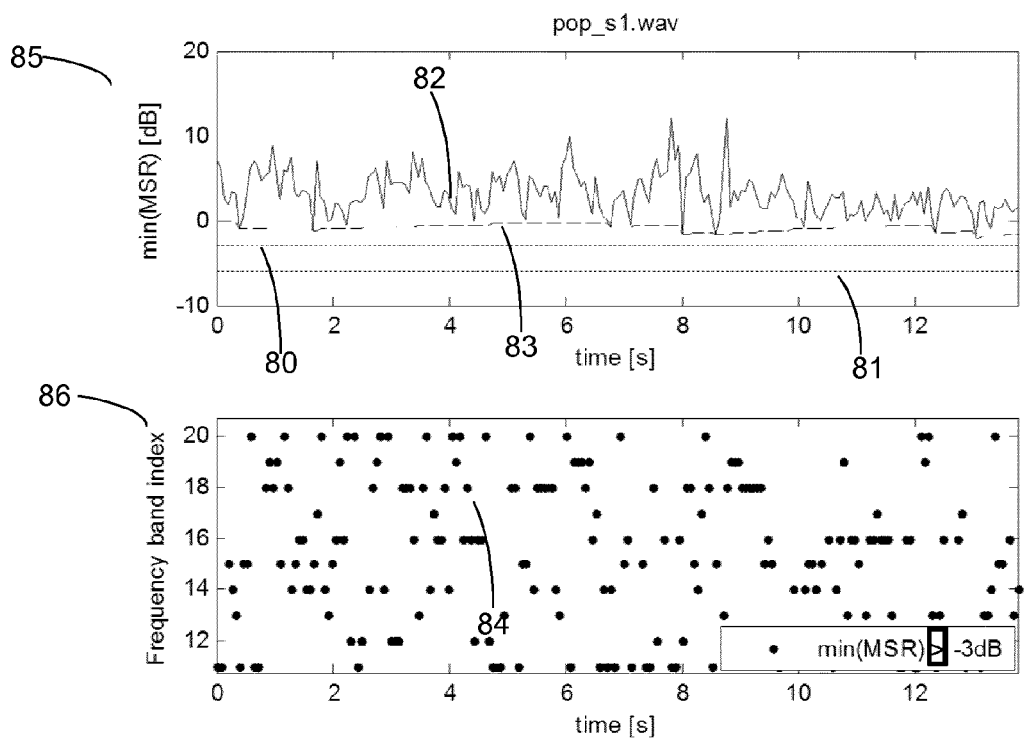

In FIG. 11, the plots 85 and 86 show a typical behavior for the HQ reception of pop music. The minimum MSR values 82 in FIG. 11 sometimes get close to 0 dB due to a wide stereo width of the pop music, but the minimum MSR values 82 rarely go under 0 dB because pop music usually comprises a high amount of high frequency energy also in the mid signal (thereby masking any noise in the high frequency bands). In the example of FIG. 11, the minimum MSR values 82 never reach below the upper threshold MSR_HIGH and hence the signal is classified as being of HQ (i.e. $\alpha_{HQ}=1$) for any given point in time. As such, the received FM signal is passed to the output along the bypass path 16. Subjective quality assessments have shown that this leads to an improved perceptual quality compared to the processing of the signal within the PS processing path 15.

Figure 12:
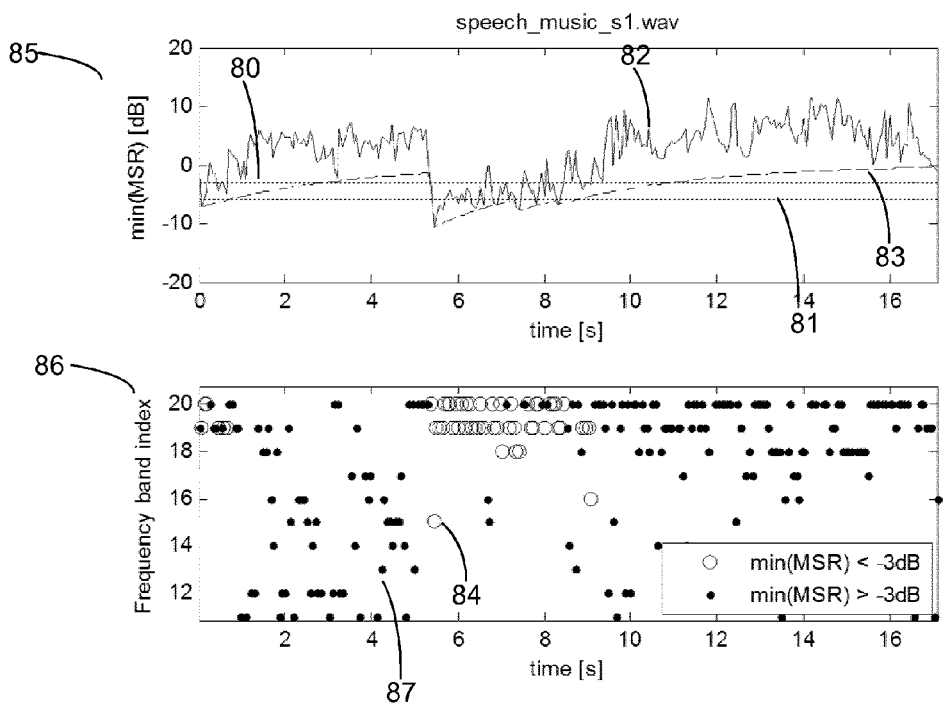

In FIG. 12, the plots 85 and 86 show the behavior when the received FM signal comprises audible noise at isolated time instants (especially at the time instants around 6-8 seconds). It can be seen that the inverted peak-decay version 83 of the minimum MSR values 82 ensures a fast switching to a non-HQ estimate when the received FM signal is deteriorated by noise. On the other hand, the inverted peak-decay version 83 of the minimum MSR values 82 ensures a smooth transition through the lower and higher thresholds towards a HQ estimate. This behavior, i.e. to react fast in response to noise bursts (and thus to apply PS processing on path 15) but to slowly fade back to a bypass mode on path 16, is usually desirable in order to maximize noise suppression but at the same time minimize artifacts from PS-to-bypass transitions.

In the present document, a method and system for improving the perceptual performance of FM radio receivers has been described. The method comprises a PS processing path and a parallel bypass path. Depending on the estimated quality of the received FM radio signal, the output signal is selected from the PS processing path and/or from the parallel bypass path. In order to ensure a smooth transition between the PS processing path and the parallel bypass path, a blending of the output signals of both paths is proposed. As a result, the overall perceptual quality of FM radio signals can be improved.

A high quality (HQ) detection scheme is described which allows to reliably estimate the quality of the received FM radio signal. The HQ detection scheme estimates the noise level or SNR (or discriminates the noise component from the signal component) in a received FM radio signal by looking for sections of the side signal of the received FM radio signal (in the time/frequency-plane) where the side signal is much stronger than the mid signal. The estimation of the SNR may be in individual frequency bands (e.g. in a QMF bank or grouped bands in a QMF bank). The resulting plurality of SNR estimates from the different frequency bands may be weighted differently and/or some bands may be excluded. In order to ensure a smooth evolution of the SNR estimates, an old SNR estimate may be used if no new estimate is available (by e.g. smoothing or peak-hold/decay). The SNR estimates may be used to determine an HQ factor as an indicator of the quality of the received FM radio signal. In particular, the minimum estimated SNR values may be used to determine the HQ factors. This HQ factor may be used to control the mix between a (noise reduction) processed signal on the PS processing path and a bypassed signal. Furthermore, the HQ factor may be used to control the downmix gain in a PS encoder or to control the prediction limiting factors in a prediction based noise reduction system. In addition to the SNR estimates, the HQ factors may take into count any of the parameters: SFM, mono concealment detection state, and/or absolute side level.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the methods and systems described in the present document are portable electronic devices or other consumer equipment which are used to store and/or render audio signals.

The invention claimed is:

1. A system configured to generate an improved stereo signal of a received FM radio signal; wherein the received FM radio signal is representable as a mid signal and a side signal; wherein the side signal is indicative of a difference between a left signal and a right signal; the system comprising:

a power determination unit configured to determine a plurality of powers for a plurality of subbands of the mid signal, referred to as subband mid powers, and a plurality of powers for a plurality of corresponding subbands of the side signal, referred to as subband side powers;

a ratio determination unit configured to determine a plurality of subband mid-to-side ratios as the ratios of the plurality of subband mid powers and the plurality of subband side powers;

a quality determination unit configured to determine a quality indicator of the received FM radio signal from the minimum of the plurality of subband mid-to-side ratios across the plurality of subbands; wherein the system is configured to generate the improved stereo signal in dependence of the determined quality indicator.

2. The system of claim 1, wherein the quality determination unit is configured to differently weight the plurality of subband mid-to-side ratios depending on frequencies covered by the respective subband, thereby yielding a plurality of weighted subband mid-to-side ratios; and determine the quality indicator of the received FM radio signal from the minimum of the plurality of weighted subband mid-to-side ratios across the plurality of subbands.

3. The system of claim 2, wherein the plurality of subbands of the mid signal and the plurality of subbands of the side signal are subbands derived using a quadrature mirror, QMF, filterbank.

4. The system of claim 3, wherein the mid signal and the side signal cover a low frequency range up to a medium frequency and a high frequency range from the medium frequency;

the medium frequency is greater or equal to 1 kHz, 2 kHz, 3 kHz, 4 kHz, 5 kHz, 6 kHz, 7 kHz, 8 kHz, 9 kHz, 10 kHz, 11 kHz or 12 kHz; and the plurality of subbands of the mid signal and the plurality of subbands of the side signal lie within the high frequency range.

5. The system of claim 1, wherein the power of the mid signal at time instant n is determined as an average of the squared mid signal at a plurality of time instants in the vicinity of the time instant n; and the power of the side signal at time instant n is determined as an average of the squared side signal at a plurality of time instants in the vicinity the time instant n.

6. The system of claim 1, wherein the power determination unit is configured to determine a sequence of mid powers and a corresponding sequence of side powers at a sequence of succeeding time instants;

the ratio determination unit is configured to determine a sequence of mid-to-side ratios at the sequence of time instants from the sequence of mid powers and the sequence of side powers; and the quality determination unit is configured to determine a sequence of quality indicators from the sequence of mid-to-side ratios.

7. The system of claim 6, wherein the power determination unit is configured to determine a sequence of pluralities of subband mid powers and a corresponding sequence of pluralities of subband side powers at the sequence of succeeding time instants;

the ratio determination unit is configured to determine a sequence of pluralities of subband mid-to-side ratios at the sequence of time instants from the sequence of pluralities of subband mid powers and the sequence of pluralities of subband side powers; and the quality determination unit is configured to determine the sequence of quality indicators from a sequence of smoothened subband mid-to-side ratios; wherein the sequence of smoothened subband mid-to-side ratios is determined by smoothening selected subband mid-to-side ratios from the sequence of pluralities of subband mid-to-side ratios along the sequence of time instants.

8. The system of claim 7, wherein the smoothing is performed using an inverted peak decay function.

9. The system of claim 8, wherein the sequence of smoothened subband mid-to-side ratios is determined by determining the smoothened subband mid-to-side ratio at time instant n as the smaller of the smoothened subband mid-to-side ratio at a preceding time instant n−1 from the sequence of time instants, weighted by a decay factor; and a minimum of the plurality of subband mid-to-side ratios at time instant n.

10. The system of claim 9, wherein the quality determination unit is configured to determine the quality indicator at time instant n from the smoothened subband mid-to-side ratio at time instant n, by normalizing the smoothened subband mid-to-side ratio using a lower power threshold and a higher power threshold.

11. The system of claim 10, wherein the quality indicator at time instant n is determined as $$\alpha_{HQ} = \begin{cases} 0, & \text{if } q < \text{MSR\_LOW} \\ 1, & \text{if } q > \text{MSR\_HIGH} \\ \frac{q - \text{MSR\_LOW}}{\text{MSR\_HIGH} - \text{MSR\_LOW}}, & \text{otherwise} \end{cases}$$

with q being the smoothened subband mid-to-side ratio at time instant n, and MSR_LOW being the lower power threshold and MSR_HIGH being the higher power threshold.

12. The system of claim 11, wherein the lower power threshold in a logarithmic domain is smaller or equal to −4 dB, −5 dB or −6 dB; and the higher power threshold in a logarithmic domain is greater or equal to −5 dB, −4 dB or −3 dB.

13. The system of claim 1, wherein the quality determination unit is configured to determine the quality indicator further based on at least a spectral flatness measure, SFM, value characteristic of the spectral flatness of the side signal.

14. The system of claim 13, wherein an increasing spectral flatness of the side signal yields a reduction of the quality indicator.

15. The system of claim 14, wherein $$\alpha_{HQ}' = (1 - \text{SFM\_impact\_factor}) * \alpha_{HQ}$$

wherein

SFM_impact_factor is a normalized SFM value ranging from 0 to 1, with 0 indicating a low degree of spectral flatness and 1 indicating a high degree of spectral flatness;

$\alpha'_{HQ}$ is the quality indicator determined based at least on the SFM value and the mid-to-side ratio;

$\alpha_{HQ}$ is the quality indicator determined based at least on the mid-to-side ratio; and $\alpha'_{HQ}$ and $\alpha_{HQ}$ are ranging from 0 to 1, with 0 indicating a low quality and 1 indicating a high quality.

16. The system of claim 1, wherein the quality determination unit is configured to determine the quality indicator further based on at least a total power level of the side signal, wherein a decreasing total power level of the side signal decreases the quality indicator.

17. The system of claim 16, wherein $$\alpha'_{HQ} = g_{gate}\alpha_{HQ}, \text{ with}$$

$$g_{gate} = \begin{cases} 0, & \text{if } S_{sum} < \text{S\_THRES\_LOW} \\ 1, & \text{if } S_{sum} > \text{S\_THRES\_HIGH} \\ \dfrac{S_{sum} - \text{S\_THRES\_LOW}}{\text{S\_THRES\_HIGH} - \text{S\_THRES\_LOW}}, & \text{otherwise} \end{cases}$$

wherein $S_{sum}$ is the total power level of the side signal;

S_THRES_LOW and S_THRES_HIGH are normalization thresholds;

$\alpha'_{HQ}$ is the quality indicator determined based at least on the total power level of the side signal and the mid-to-side ratio;

$\alpha_{HQ}$ is the quality indicator determined based at least on the mid-to-side ratio; and $\alpha'_{HQ}$ and $\alpha_{HQ}$ are ranging from 0 to 1, with 0 indicating a low quality and 1 indicating a high quality.

18. The system of claim 1, wherein the quality determination unit is configured to determine the quality indicator further based on at least a channel level difference, CLD, parameter, wherein the channel level difference parameter reflects a ratio between a power of the left signal and a power of the right signal.

19. The system of claim 18, wherein the quality determination unit is configured to determine the quality indicator at least from the sum of the mid-to-side ratio and the absolute value of the CLD parameter.

20. The system of claim 1, further comprising an FM noise reduction unit configured to generate a noise reduced stereo signal from the received FM radio signal at least based on one or more parameters indicative of the correlation and/or the difference of the left and right signals; and a bypass configured to provide the left and right signal; and a combining unit configured determine the improved stereo signal from the noise reduced stereo signal and the left and right signal using the quality indicator.

21. The system of claim 20, wherein the FM noise reduction unit is configured to generate the noise reduced stereo signal from the received FM radio signal using the quality indicator.

22. The system of claim 21, wherein the FM noise reduction unit is configured to generate a noise reduced side signal of the noise reduced stereo signal from a downmix signal determined from the sum of the left and right signals adjusted by a downmix gain;

the downmix gain is indicative of an in-phase and/or out-of-phase behaviour of the left and right signals; and the downmix gain is adjusted by the quality indicator.

23. The system of claim 22, wherein the FM noise reduction unit is configured to generate the noise reduced stereo signal from a parametric stereo representation of the received FM radio signal; wherein the parametric stereo representation comprises one or more parametric stereo parameters.

24. The system of claim 23, wherein the FM noise reduction unit is configured to conceal a dropout of the received FM stereo signal to mono at time instant n using the one or more parametric stereo parameters determined at a time instant preceding the time instant n; and the quality indicator is modified, subject to concealment within the FM noise reduction unit.

25. The system of claim 24, wherein the combining unit is configured to blend between the noise reduced stereo signal and the left and right signal using the quality indicator.

26. The system of claim 25, wherein the combining unit comprises a noise reduced stereo gain unit configured to weight the noise reduced stereo signal using a noise reduced stereo gain;

a bypass gain unit configured to weight the left and right signals using a bypass gain; and a merging unit configured to merge respective signals of the weighted noise reduced stereo signal and the weighted left and right signals; wherein the noise reduced stereo gain and the bypass gain are dependent on the quality indicator.

27. The system of claim 26, wherein $$\begin{pmatrix} L_{out} \\ R_{out} \end{pmatrix} = \alpha_{HQ} \begin{pmatrix} L_{FM} \\ R_{FM} \end{pmatrix} + (1 - \alpha_{HQ}) \begin{pmatrix} L_{PS} \\ R_{PS} \end{pmatrix}$$

with $L_{out}$, $R_{out}$ being a left and right signal of the improved stereo signal;

$L_{FM}$, $R_{FM}$ being the left and right signals;

$L_{PS}$, $R_{PS}$ being a left and right signal of the noise reduced stereo signal; and $\alpha_{HQ}$ being the quality indicator ranging from 0 to 1, with 0 indicating a low quality and 1 indicating a high quality.

28. A mobile communication device comprising:

an FM stereo receiver configured to receive an FM radio signal; and a system according to claim 1.

29. A method for generating an improved stereo signal from a received FM radio signal; wherein the received FM radio signal is presentable as a mid signal and a side signal; wherein the side signal is indicative of a difference between a left signal and a right signal; the method comprising:

determining a plurality of powers for a plurality of subbands of the mid signal, referred to as subband mid powers, and a plurality of powers for a plurality of corresponding subbands of the side signal, referred to as subband side powers;

determining a plurality of subband mid-to-side ratios as the ratios of the plurality of subband mid powers and the plurality of subband side powers;

determining a quality indicator of the received FM radio signal from the minimum of the plurality of subband mid-to-side ratios across the plurality of subbands; and generating the improved stereo signal from the received FM radio signal using the quality indicator.

30. A non-transitory computer readable storage medium comprising a software program adapted for execution on a processor and for performing the method steps of claim 29 when carried out on a computing device.

* * * * *